United States Patent
Kanazawa et al.

(10) Patent No.: US 10,945,169 B2
(45) Date of Patent: Mar. 9, 2021

(54) BASE STATION, MOBILE COMMUNICATION SYSTEM AND HANDOVER CONTROL METHOD

(71) Applicant: SoftBank Corp., Tokyo (JP)

(72) Inventors: Noboru Kanazawa, Tokyo (JP); Daigo Ogata, Tokyo (JP); Atsushi Nagate, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 69 days.

(21) Appl. No.: 16/092,659

(22) PCT Filed: Mar. 3, 2017

(86) PCT No.: PCT/JP2017/008600
§ 371 (c)(1),
(2) Date: Oct. 10, 2018

(87) PCT Pub. No.: WO2017/179334
PCT Pub. Date: Oct. 19, 2017

(65) Prior Publication Data
US 2019/0174373 A1    Jun. 6, 2019

(30) Foreign Application Priority Data
Apr. 12, 2016   (JP) ............................. JP2016-079732

(51) Int. Cl.
*H04W 36/00*   (2009.01)
*H04W 36/08*   (2009.01)
(Continued)

(52) U.S. Cl.
CPC ... *H04W 36/0085* (2018.08); *H04W 36/0079* (2018.08); *H04W 36/08* (2013.01);
(Continued)

(58) Field of Classification Search
CPC . H04W 36/30; H04W 36/0079; H04W 36/38; H04W 36/0085; H04W 36/08; H04W 92/20
See application file for complete search history.

(56) References Cited

U.S. PATENT DOCUMENTS

2011/0287805 A1* 11/2011 Kaminski ............. H04W 36/08
                                                                            455/525
2011/0310852 A1* 12/2011 Dimou .................. H04W 36/08
                                                                            370/332
(Continued)

FOREIGN PATENT DOCUMENTS

| EP | 2 214 436 A1 | 8/2010 |
|---|---|---|
| EP | 2 713 655 A1 | 4/2014 |

(Continued)

OTHER PUBLICATIONS

Lte, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP TS 36.300, V9.10.0, Dec. 2012.
(Continued)

*Primary Examiner* — Redentor Pasia
(74) *Attorney, Agent, or Firm* — Muirhead and Saturnelli, LLC

(57) ABSTRACT

A base station, a mobile communication system and a handover control method are provided, which are capable of preventing a handover failure and a ping-pong handover phenomenon which are caused by an interference from a neighboring cell to a serving cell. When a received power difference (S2−S1) between a received power S2 from a neighboring second base station, which is fed back from a mobile station, and a received power S1 from first base station, becomes larger than a predetermined threshold
(Continued)

value, the first base station to which the mobile station is connected requests the second base station to stop a transmission of a downlink signal including at least one of a data signal and a control signal. In response to the transmission-stop request, the second base station performs a determination of a radio resource in which the transmission of the downlink signal is to be stopped and a notification of the radio resource to the first base station, and stops a transmission of a downlink signal. The first base station allocates the radio resource notified from the second base station or a radio resource partially including the notified radio resource, as a radio resource used for the downlink signal to the mobile station.

10 Claims, 14 Drawing Sheets

(51) Int. Cl.
  *H04W 36/30* (2009.01)
  *H04W 92/20* (2009.01)
  *H04W 36/38* (2009.01)
(52) U.S. Cl.
  CPC ........... *H04W 36/30* (2013.01); *H04W 36/38* (2013.01); *H04W 92/20* (2013.01)

(56) References Cited

U.S. PATENT DOCUMENTS

| | | | | |
|---|---|---|---|---|
| 2012/0129522 | A1* | 5/2012 | Kim | H04W 72/0426 455/434 |
| 2012/0176892 | A1 | 7/2012 | Yamamoto et al. | |
| 2012/0214489 | A1* | 8/2012 | Koo | H04W 36/0083 455/436 |
| 2013/0201914 | A1* | 8/2013 | Wang | H04W 24/10 370/328 |
| 2014/0213255 | A1 | 7/2014 | Ericsson | |
| 2014/0293962 | A1* | 10/2014 | Wang | H04W 36/0088 370/331 |
| 2015/0031367 | A1* | 1/2015 | Singh | H04L 43/0882 455/437 |
| 2016/0192261 | A1* | 6/2016 | Wang | H04W 36/16 370/331 |
| 2017/0064587 | A1* | 3/2017 | Xu | H04W 36/0094 |
| 2017/0367011 | A1* | 12/2017 | Ekemark | H04W 28/085 |
| 2018/0206171 | A1* | 7/2018 | Basu Mallick | H04W 36/30 |

FOREIGN PATENT DOCUMENTS

| | | |
|---|---|---|
| EP | 3 068 171 A1 | 9/2016 |
| JP | 2001-238251 A1 | 8/2001 |
| JP | 2012-509620 A | 4/2012 |
| JP | 2012-516595 A1 | 7/2012 |
| JP | 2012-147258 A | 8/2012 |
| JP | 2013-510518 A | 3/2013 |
| JP | 2014-107845 A | 6/2014 |
| KR | 10-2011-0089350 A | 8/2011 |
| KR | 10-2013-0105669 A | 9/2013 |
| KR | 10-2014-0074341 A | 6/2014 |
| WO | WO 2008/096240 A1 | 8/2008 |
| WO | WO 2010/057128 A1 | 5/2010 |
| WO | WO 2010/086172 A1 | 8/2010 |
| WO | WO 2012/103937 A1 | 8/2012 |
| WO | WO 2015/065148 A1 | 5/2015 |

OTHER PUBLICATIONS

Lte, $3^{rd}$ Generation Partnership Project; Technical Specification Group Radio Access Network; Evolved Universal Terrestrial Radio Access (E-UTRA); Radio Resource Control (RRC); Protocol specification (Release 9), 3GPP TS 36.331, V9.18.0, Jun. 2014.

* cited by examiner

BASE STATION, MOBILE COMMUNICATION SYSTEM AND HANDOVER CONTROL METHOD

TECHNICAL FIELD

The present invention relates to a base station, a mobile communication system and a handover control method.

BACKGROUND ART

A handover in a cellular mobile communication system is conventionally known, in which a communication of a mobile station is continued by switching a base station to which the mobile station connects and communicates to another base station of a neighboring cell, when the mobile station in communication running on a serving cell moves to another neighboring cell (for example, refer to Non-Patent Literatures 1 and 2).

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2; Protocol specification" V9.10.0, chapter 10.

Non-Patent Literature 2: 3GPP TS 36.331 "Evolved Universal Terrestrial Radio Access (E-UTRA); Radio Resource Control (RRC); Protocol specification" V9.18.0, chapter 5.5.4.4.

SUMMARY OF INVENTION

Technical Problem

In the conventional handover, the handover may fail or a phenomenon (ping-pong handover phenomenon) in which the handover is repeated between both cells may occur, due to interference from neighboring cells to the serving cell to which the mobile station is connected.

The present invention has been made in view of the above problems, and it is an object of the present invention to provide a base station, a mobile communication system and a handover control method which are capable of preventing a handover failure and ping-pong handover phenomenon caused by interference from neighboring cells to the serving cell to which the mobile station is connected.

Solution to Problem

A mobile communication system according to one aspect of the present invention is a mobile communication system comprising a first base station to which a mobile station is connected and one or a plurality of second base stations located in a vicinity of the first base station. The first base station compares a received power S2 from the second base station, which is fed back from the mobile station, and a received power S1 from the first base station, which is fed back from the mobile station, and requests the second base station to stop a transmission of a downlink signal including at least one of a data signal and a control signal when a received power difference (S2−S1) between the received powers becomes larger than a predetermined threshold value, or becomes equal to or larger than the threshold value.

The second base station performs a determination of a radio resource in which the transmission of the downlink signal is to be stopped and a notification of the radio resource to the first base station, and stops a transmission of a downlink signal, in response to the request of transmission stop. The first base station allocates the radio resource notified from the second base station or a radio resource partially including the notified radio resource, as a radio resource used for the downlink signal to the mobile station.

In the foregoing mobile communication system, when the received power difference (S2−S1) becomes larger than a predetermined threshold value, or becomes equal to or larger than the threshold value and when a received quality Q1 from the first base station, which is fed back from the mobile station, becomes smaller than a predetermined threshold value, or becomes equal to or lower than the threshold value, the first base station may request the second base station to stop the transmission of the downlink signal.

A mobile communication system according to another aspect of the present invention is a mobile communication system including a first base station to which a mobile station is connected and a plurality of second base stations located in a vicinity of the first base station, a received power S2 from the plurality of second base stations, which is fed back from the mobile station, and a received power S1 from the first base station, which is fed back from the mobile station, are compared, and a stop of transmission of a downlink signal including at least one of a data signal and a control signal is requested for one or a plurality of higher-order second base stations in descending order of the received power difference (S2−S1) among a plurality of second base stations in which the received power difference (S2−S1) becomes larger than a predetermined threshold value, or becomes equal to or larger than the threshold value. The one or the plurality of higher-order second base stations determine a radio resource in which the transmission of the downlink signal is to be stopped, notify the first base station of the radio resource and stop the transmission of the downlink signal, in response to the request of transmission stop. The first base station allocates the radio resource notified from the one or the plurality of higher-order second base stations or a radio resource partially including the notified radio resource, as a radio resource used for the downlink signal to the mobile station.

In the foregoing mobile communication system, when a received quality Q1 from the first base station, which is fed back from the mobile station, becomes smaller than a predetermined threshold value, or becomes equal to or lower than the threshold value, the first base station may request a transmission stop of the downlink signal including at least one of the data signal and the control signal for the one or the plurality of higher-order second base stations in descending order of the received power difference (S2−S1) among the plurality of second base stations in which the received power difference (S2−S1) becomes larger than predetermined threshold value, or becomes equal to or larger than the threshold value.

In the foregoing mobile communication system, the downlink signal for stopping the transmission may include both of the data signal and the control signal.

In the foregoing mobile communication system, the first base station may designate at least one of a time and a frequency of a radio resource in which the transmission of the downlink signal is to be stopped, when the first base station requests the second base station to stop the transmission of the downlink signal.

In the foregoing mobile communication system, the first base station designates an amount of radio resources in which the transmission of the downlink signal is to be stopped when requesting the second base station to stop the transmission of the downlink signal, and the second base station may designate at least one of a time and a frequency of a radio resource in which the transmission of the downlink signal is to be stopped, so as to satisfy the radio resource amount designated by the first base station.

In the foregoing mobile communication system, when completing a handover process for switching the base station to which the mobile station is connected from the first base station to the second base station, the second base station may terminate the transmission stop of the downlink signal with respect to a radio resource allocated to a mobile station in which the handover process is completed among a plurality of mobile stations connected to the second base station.

In the foregoing mobile communication system, when a predetermined time has elapsed from a start of transmission stop of the downlink signal in the second base station, the second base station may terminate the transmission stop of the downlink signal with respect to a radio resource allocated to a mobile station in which the predetermined time has elapsed from the start of transmission stop of the downlink signal among the plurality of mobile stations connected to the second base station.

In the foregoing mobile communication system, based on the received power difference (S2−S1) between the received power of a reference signal from the second base station and the received power of a reference signal from the first base station in the mobile station, the second base station may terminate the transmission stop of the downlink signal with respect to a radio resource allocated to a mobile station in which the received power difference (S2−S1) is smaller than a predetermined threshold value, or equal to or smaller than the threshold value, among the plurality of mobile stations connected to the second base station.

In the foregoing mobile communication system, based on a prediction result of a received quality of downlink signal from the first base station in the mobile station, the second base station may terminate the transmission stop of the downlink signal with respect to a radio resource allocated to a mobile station in which the prediction result of the received quality has become larger than predetermined threshold value or become equal to or larger than the threshold value, among the plurality of mobile stations connected to the second base station.

In the foregoing mobile communication system, the first base station may instruct the mobile station so that the mobile station performs a next feedback of the received power from the second base station and the first base station earlier than when the received power difference (S2−S1), which is a reference for starting a handover for switching a base station to which the mobile station is connected from the first base station to the second base station, reaches a normal handover threshold value.

In the foregoing mobile communication system, when the received quality Q1 from the first base station, which is fed back from the mobile station, falls below a predetermined threshold value, or becomes equal to or less than the threshold value, the first base station may determine to start the handover of the mobile station earlier than when the received power difference (S2−S1), which is a reference for starting a handover to switch a base station to which the mobile station is connected from the first base station to the second base station, reaches a normal handover threshold value.

A mobile communication system according to yet another aspect of the present invention is a mobile communication system including a first base station to which a mobile station is connected and one or a plurality of second base stations located in a vicinity of the first base station. The first base station compares a received power S2 from the second base station, which is fed back from the mobile station and a received power S1 from the first base station, which is fed back from the mobile station, and requests the mobile station so that the mobile station performs a feedback of the received power from the second base station and the first base station earlier than when the received power difference (S2−S1), which is a reference for starting a handover to switch a base station to which the mobile station is connected from the first base station to the second base station, reaches a normal handover threshold value. And when the received quality Q1 from the first base station, which is fed back from the mobile station falls below a predetermined threshold value or becomes equal to or less than the threshold value, the first base station determines to start the handover of the mobile station earlier than when the received power difference (S2−S1), which is a reference for starting a handover of the mobile station, reaches the normal handover threshold value.

A base station according to another aspect of the present invention is a base station of a mobile communication system. The base station compares a received power S2 from one or a plurality of other base stations located in a vicinity of the own base station, which is fed back from the mobile station connected to the own base station, and a received power S1 from the own station, which is fed back from the mobile station, requests the other base station to stop a transmission of a downlink signal including at least one of a data signal and a control signal when a received power difference (S2−S1) becomes larger than a predetermined threshold value, or becomes equal to or larger than the threshold value, and allocates a radio resource notified from the other base station or a radio resource partially including the notified radio resource, as a radio resource used for the downlink signal to the mobile station.

A base station according to yet another aspect of the present invention is a base station of a mobile communication system. The base station compares a received power S2 from a plurality of other base stations located in a vicinity of the own base station, which is fed back from mobile station connected to the own base station, and a received power S1 from the own base station, which is fed back from the mobile station, requests the other base station to stop a transmission of a downlink signal including at least one of a data signal and a control signal for one or a plurality of higher-order other base stations in descending order of the received power difference (S2−S1) among a plurality of other base stations in which the received power difference (S2−S1) becomes larger than a predetermined threshold value, or becomes equal to or larger than the threshold value, and allocates the radio resource notified from one or the plurality of higher-order other base stations or a radio resource partially including the notified radio resource, as a part thereof, as a radio resource used for the downlink signal to the mobile station.

A base station according to yet another aspect of the present invention is a base station of a mobile communication system. The base station compares a received power S2 from one or a plurality of other base stations located in a vicinity of the own base station, which is fed back from mobile station connected to the own base station, and a received power S1 from the own base station, which is fed back from the mobile station, and requests the mobile station so that the mobile station performs a next feedback of the received power from the other base station and the own base station earlier than when the received power difference (S2−S1), which is a reference for starting a handover for switching a base station to which the mobile station is connected from the own base station to the other base station, reaches a normal handover threshold value.

A base station according to yet another aspect of the present invention is a base station of a mobile communication system. When a received quality Q1 from the own base station, which is fed back from a mobile station to which the own base station is connected, falls below a predetermined threshold value, or becomes equal to or less than the threshold value, the base station determines a start of handover of the mobile station earlier than when a received power difference (S2−S1), which is a reference for starting a handover for switching a base station to be connected with the mobile station from the own base station to another base station, between a received power S2 from one or a plurality of other base stations located in a vicinity of the own base station, which is fed back from the mobile station and a received power S1 from the own base station, which is fed back from the mobile station, reaches a normal handover threshold value.

A base station according to another aspect of the present invention is a base station of a mobile communication system. The base station performs a determination of a radio resource in which a transmission of downlink signal is to be stopped and a notification of the determined radio resource to another base station, and stops a transmission of the downlink signal, in response to a transmission-stop request received from the other base station which is located in a vicinity of the own base station and connected with a mobile station.

A handover control method according to another aspect of the present invention is a handover control method for controlling a handover of a mobile station in a mobile communication system. The handover control method includes stopping a transmission of downlink signal from the second base station, when performing a handover determination process for determining a start of handover from a source cell of a first base station connected with a mobile station to a target cell of a second base station to be handovered thereto by the mobile station.

Advantageous Effects of Invention

According to the present invention, it is possible to prevent a handover failure and ping-pong handover phenomenon caused by an interference from a neighboring cell to a serving cell.

DESCRIPTION OF EMBODIMENTS

Hereinafter, various embodiments of the present invention will be described with reference to the drawings.

In the present description, although embodiments of the present invention will be described subject to applicability to the LTE (Long Term Evolution)/LTE-Advanced, a concept of the present invention can be applied to any system that uses a similar cell configuration or physical channel configuration. In addition, a reference signal sequence used for estimating a propagation path and a coding method used for an error correction are not limited to those defined by the LTE/LTE-Advanced, and any type can be used as long as it is suitable for these applications.

First, an overall configuration of a mobile communication system capable of applying a mobile station according to the present invention will be described.

Figure 1:
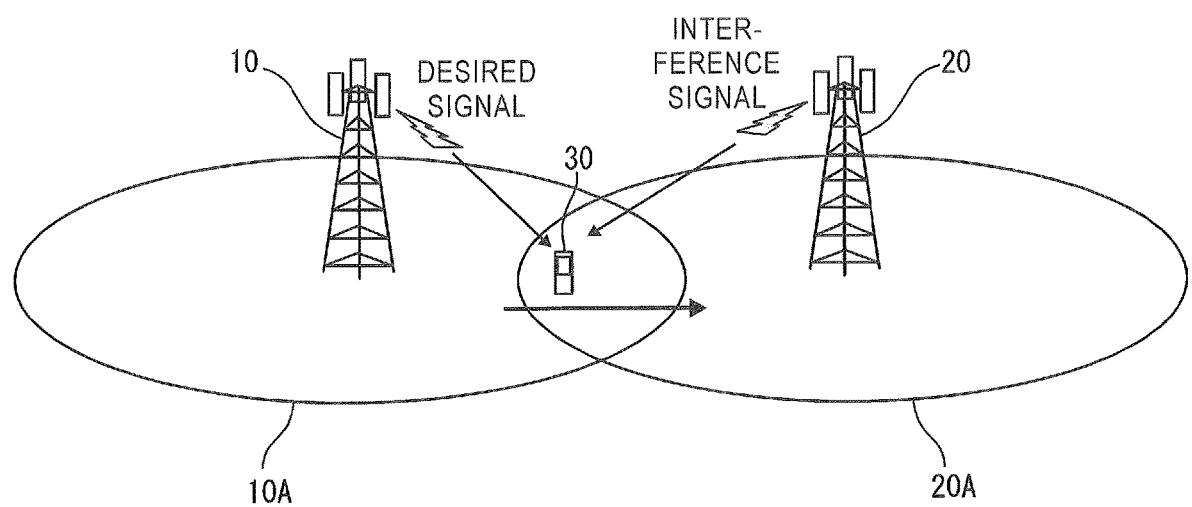
FIG. 1 is an illustration showing a schematic configuration of a mobile communication system, in which a mobile station apparatus can communicate, according to an embodiment of the present invention.

FIG. 1 is an illustration showing a schematic configuration of a mobile communication system, in which a mobile station apparatus can communicate according to an embodiment of the present invention.

In FIG. 1, a mobile communication system of the present embodiment is a mobile communication system conforming to the above-mentioned LTE/LTE-Advanced specification, and includes a first base station 10 and a second base station 20 in which cells 10A and 20A as radio communication areas are adjacent to each other. The mobile communication system is configured to be capable of continuously communicating by a handover when a user terminal equipment UE (hereinafter referred to as "terminal") 30 as a mobile station moves between the cells 10A and 20A. In FIG. 1, the terminal 30 is located in the cell 10A of the first base station 10 and is in a state capable of receiving a downlink radio signal of a telephone and data communication etc. as a desired signal (desired wave) from the first base station 10. Since the terminal 30 is located in a cell boundary area between the cell 10A and the cell 20A, the terminal 30 may receive a downlink radio signal transmitted from the second base station 20 as an interference signal (interference wave).

It is noted that, in FIG. 1, although the first base station 10, the second base station 20 and the terminal 30 are illustrated one by one, each of the first base station 10, the second base station 20 and the terminal 30 may be plural. In FIG. 1, although it is described a case in which each of the first base station 10 and the second base station 20 is a macro-cell base station, each of the first base station 10 and the second base station 20 may be a small-cell base station. Furthermore, one of the first base station 10 and the second base station 20 may be a macro-cell base station and the other may be a small-cell base station. Moreover, one of the first base station 10 and the second base station 20 may be located in the cell of the other base station. For example, a heterogeneous network (HetNet) may be configured, in which the first base station 10 is a macro-cell base station and the second base station 20 is a small-cell base station disposed in the macro cell.

A macro-cell base station used as the first base station 10 and the second base station 20 in the present embodiment is a wide area base station that covers a macro cell as a normal wide area with a radius from about several hundred meters to several kilometers in a mobile communication network, which is generally called an eNB (Evolved Node-B) in the LTE/LTE-Advanced, and may be referred to as a "Macro e-Node B", "MeNB", or the like. The macro-cell base station is connected to another base station via a wired communication line, for example, and is capable of communicating with a predetermined communication interface. The first base station 10 is connected to a core network of the mobile communication network via a line terminating apparatus and a leased line, and can communicate with various nodes in the mobile communication network through a predetermined communication interface.

A small-cell base station that can be used as at least one of the first base station 10 and the second base station 20 of the present embodiment is a base station capable of mobile installation, which can be disposed indoors such as an ordinary home, shop, office, etc. and a radio communicable distance of the small-cell base station is about several meters to several hundred meters, different from the macro-cell base station for wide area. Since the small-cell base station is disposed so as to cover an area (for example, micro cell or pico cell) smaller than the area covered by the macro-cell base station for wide area in the mobile communication network, the small-cell base station 20 may be referred to as a micro base station or a pico base station, or the like. Also, the small-cell base station may be a base station called a "femto base station", "Home e-Node B", "Home eNB". A small cell base station is also connected to the core network of the mobile communication network via a line terminating device and a broadband public communication line such as an ADSL (Asymmetric Digital Subscriber Line) line or an optical line, and is connected to the core network and can communicate with each of various nodes on the core network by a predetermined communication interface.

The terminal 30 used by the user is generally called UE (User Equipment) in the LTE/LTE-Advanced. When the terminal 30 is located in the cell 10A of the first base station 10 or the cell 20A of the second base station 20, the terminal 30 is capable of performing a radio communication with the first base station 10 and the second base station 20 corresponding to the cell in which the terminal is located, by using a predetermined communication system and resources.

Figure 2:
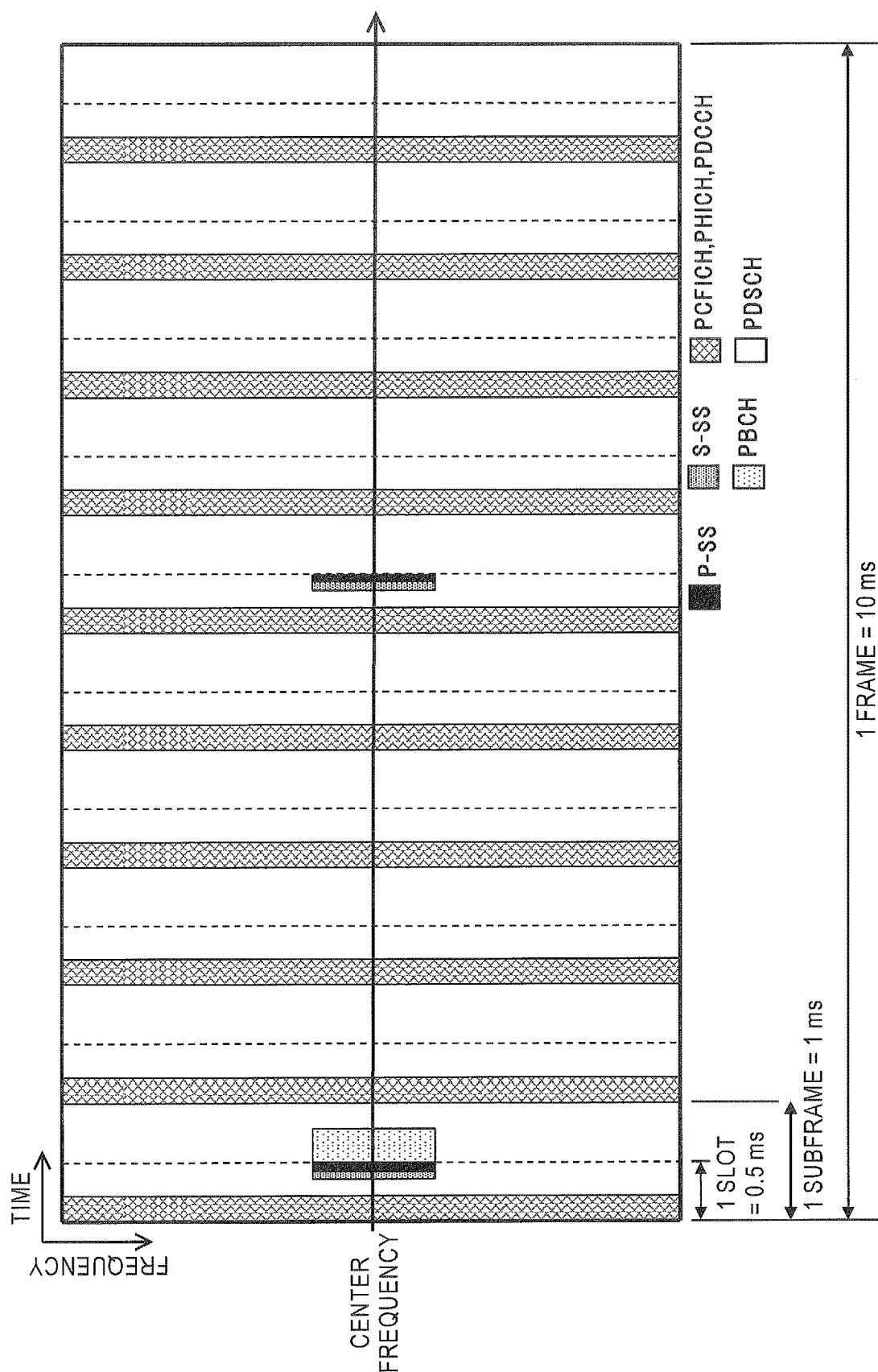
FIG. 2 is an illustration showing an example of a downlink frame configuration, a subframe configuration, and a channel configuration in a Normal Cyclic Prefix specification of the LTE/LTE-Advanced.
Figure 3:
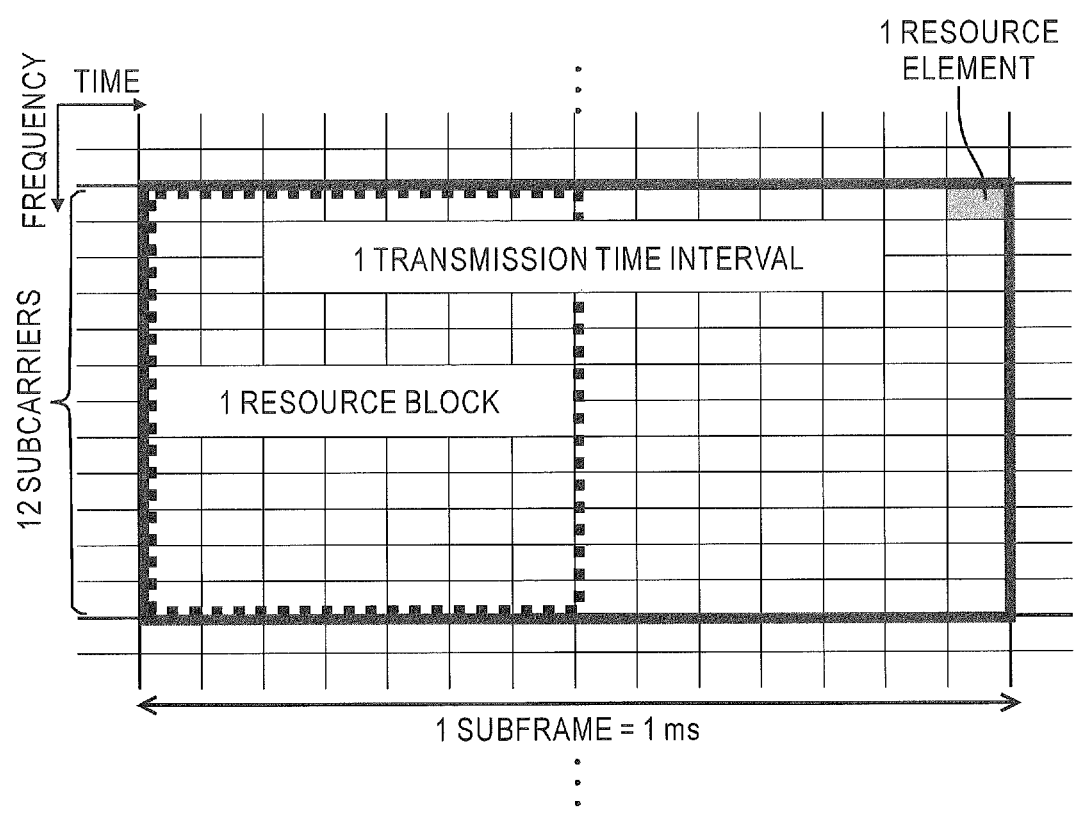
FIG. 3 is an illustration showing a configuration example of a subframe.

FIG. 2 is an illustration showing an example of a downlink frame configuration, a subframe configuration, and a channel configuration in a Normal Cyclic Prefix (hereinafter referred to as "Normal CP") specification of the LTE/LTE-Advanced. FIG. 3 is an illustration showing a configuration example of a subframe. The radio frame length is 10 ms and composed of ten subframes of 1 ms length.

As shown in FIG. 3, the subframe is composed of 14 OFDM symbols. In addition, a minimum unit of radio resource allocation is called as a RB (Resource Block), which is composed of a total of 84 REs (Resource Elements) of 12 subcarriers in a frequency direction and 7 OFDM symbols in a time axis direction. A TTI (Transmission Time Interval), which is a minimum unit of scheduling, is one subframe (14 OFDM symbols), a scheduling such as which frequency/time resource mapping each mobile station apparatus is mapped every subframe, what kind of modulation format (modulation method, coding rate) a downlink signal such as a data signal to each terminal uses and the like is performed, and the result of scheduling is notified to the terminal 30. A downlink physical channel and a role thereof will be described below.

[Synchronization Signal (SS)]

Searching for an optimum cell to be connected by the terminal 30 is called as a "cell search", and a signal used for the cell search is called as a synchronization signal (SS: synchronization signal). The synchronization signal SS is transmitted within a minimum frequency bandwidth using central 72 subcarriers of a system band. By transmitting the synchronization signal SS within the minimum frequency bandwidth, the terminal 30 can perform a cell search without considering a system bandwidth used in the system. The synchronization signal SS has two types of code sequences, and includes a P-SS (Primary-SS) for a symbol timing synchronization and local ID detection, an S-SS (Secondary-SS) for a radio frame synchronization and a cell ID group detection. By detecting a combination of these two sequences, it is possible to acquire a physical layer cell ID (hereinafter referred to as "cell ID") that is identification information of the cell.

[Physical Broadcast Channel (PBCH)]

The physical broadcast channel (PBCH: Physical Broadcast Channel) includes only minimum information that the terminal 30 should read first after the cell search. The information is called a MIB (Master Information Block) and includes basic information such as system bandwidth and system frame number (SFN: System Frame Number). Regarding a SIB (System Information Block) that is another system information, it is transmitted on a physical shared data channel (PDSCH: Physical Downlink Shared Channel) described later. By decoding the PBCH, the terminal 30 can acquire information on the number of transmission antennas of the base station of the cell. Since the PBCH needs to be decoded without prior information on the system bandwidth as same as the SS, it is transmitted within a minimum bandwidth at the center of the band.

[Reference Signal (RS)]

Figure 4:
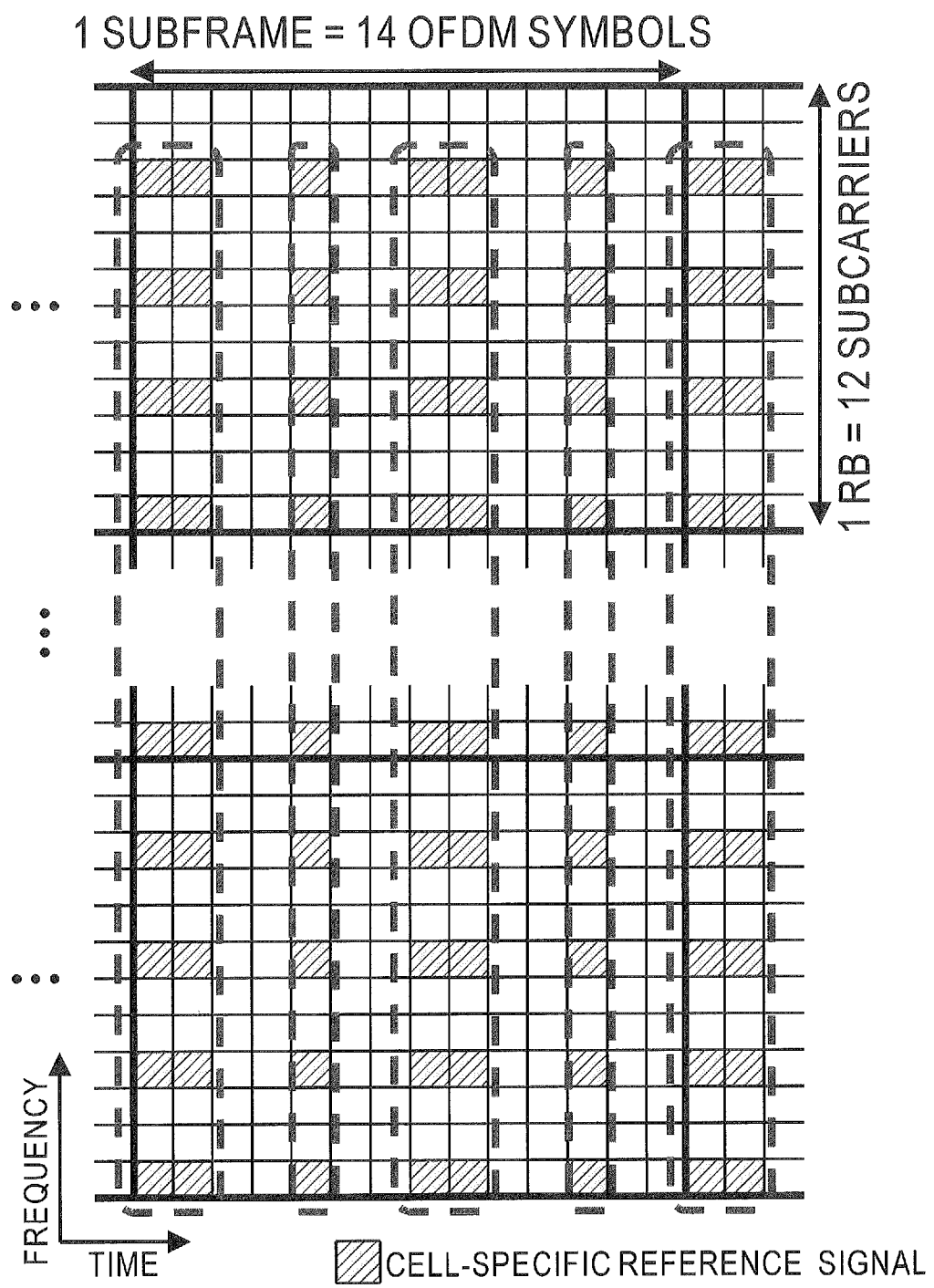
FIG. 4 is an illustration showing a configuration example of a reference signal in the Normal CP specification of the LTE and LTE-Advanced.

FIG. 4 is an illustration showing a configuration example of a reference signal in the Normal CP specification of the LTE and LTE-Advanced. As shown in FIG. 4, in the LTE, a cell-specific reference signal (CRS: Cell-specific Reference Signal) is regularly arranged and dispersed in the entire CC (on the frequency axis and on the time axis) within the 1st, 5th, 8th and 12th OFDM symbols among the 14 OFDM symbols in the time domain within the subframe, at 6 subcarrier intervals in the frequency domain, and is always transmitted. In addition, the CRS plays two roles of a reference signal for measuring channel quality information (CSI: Channel State Information) in the terminal 30 and a reference signal for data demodulation. Depending on the cell ID, a frequency shift of the subcarrier position mapped with different scrambling is applied to the CRS.

[L1/L2 Control Channel (PCFICH, PHICH, PDCCH)]

The downlink L1/L2 control signal is control information closed in the Layer-1 (L1) and Layer-2 (L2), and corresponds to three different physical channels of a PCFICH (Physical Control Format Indicator Channel), a PHICH (Physical HARQ Indicator Channel) and a PDCCH (Physical Downlink Control Channel).

The PCFICH notifies the number of OFDM symbols used by the PDCCH, and usually indirectly indicates a start timing of the data area in the subframe. The PCFICH notifies the terminal 30 of which of 1, 2 or 3 OFDM symbols corresponds to the size of the control signal area by a CFI (Control Format Indicator) value in the PCFICH. Since the size of the control signal area is not known until PCFICH is decoded, the PCFICH is always mapped to the first OFDM symbol of each subframe.

The PHICH notifies a retransmission-request signal to the PUSCH (Physical Uplink Shared Channel) that is an uplink shared channel. The PHICH is usually transmitted in the first OFDM in each subframe regardless of an instruction of the PCFICH. The PHICH can also be semi-statically transmitted using the first, second and third OFDM symbol intervals by a PHICH related parameter set in the MIB. In this case, the number of OFDM symbols in the control signal area is 3 regardless of the instruction of the PCFICH, and the start timing of the data area is fixed.

The PDCCH is used for a determination of uplink and downlink scheduling and a transmission of control information (DCI: Downlink Control Information) such as an uplink power control command. The DCI includes a PDSCH resource indication, a transmission format, HARQ information, and a downlink scheduling allocation including control information on a spatial multiplexing. The DCI also includes a PUSCH resource indication, a transmission format, HARQ related information and an uplink scheduling grant. The uplink scheduling grant also includes a command for power control of the PUSCH uplink physical channel. The DCI also includes a power control commands for a set of UE, which is a supplementary commands in the scheduling allocation/grant.

As described above, each of the subframes is divided into a control signal area to which the RE of the downlink L1/L2 control channel signal is mapped, and a data area to which the RE of a physical shared channel signal which is a downlink signal including a data signal of each user and a control signal of an upper layer than the L1/L2 is mapped, and a control signal or data signal is arranged for a RE other than the RE allocated to the CRS. The control signal area is the first 1 to 3 OFDM symbols of each of the subframes in accordance with the resource amount.

[Physical Shared Channel (PDSCH)]

The PDSCH is a physical channel that transmits a downlink data signal. The SIB as broadcast information other than the MIB, paging information as a call upon an incoming call, and another control message of an upper layer, for example, control information on a RRC (Radio Resource Control Protocol) layer are also transmitted on the PDSCH. The terminal 30 decodes the PDSCH based on information such as a radio resource allocation position, a modulation scheme and a data size (TB: Transport Block size) acquired from the PDCCH.

Next, it is described a handover processing when the terminal 30 moves from the cell 10A of the first base station 10 connected to the terminal 30 to the cell 20A of the second base station 20 through the cell boundary area and located in the cell 20A.

It is noted that, in the following description, the cell 10A and the first base station 10 to which the terminal 30 before the handover is connected are referred to as a source cell 10A and a source cell base station 10 respectively, and the cell 20A and the second base station 20 to which the terminal 30 after the handover connected are referred to as a target cell 20A and a target cell base station 20 respectively.

Figure 5A:
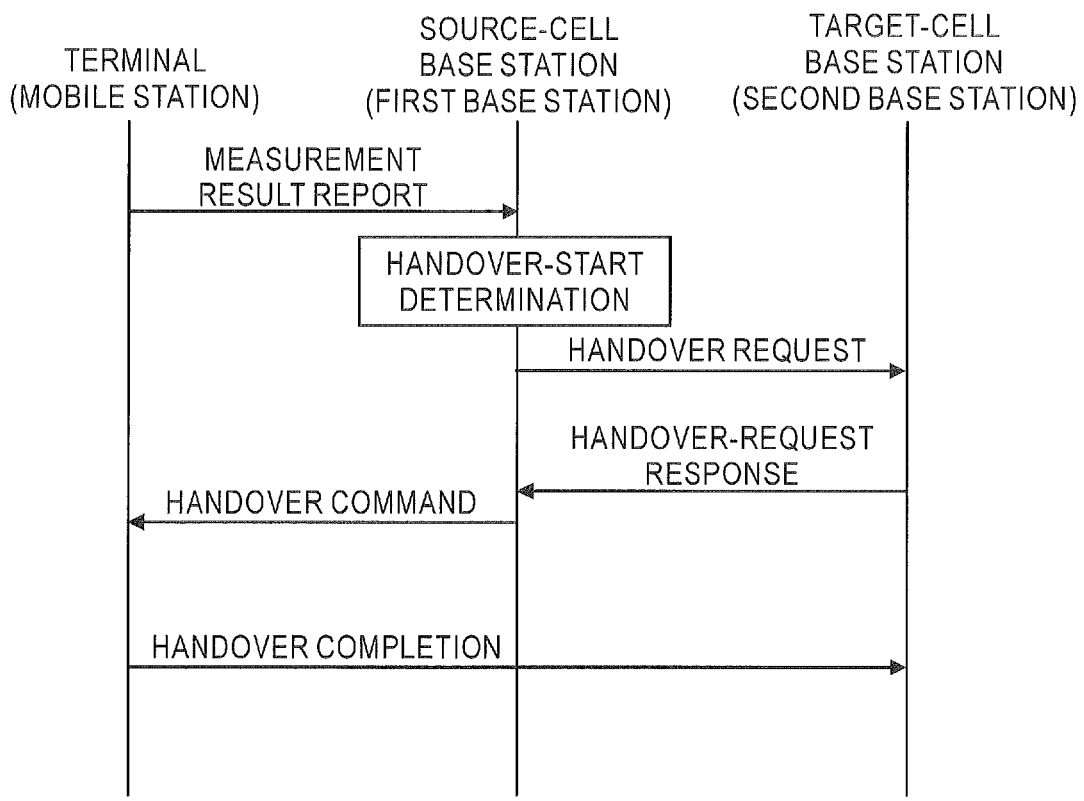
FIG. 5A is a sequence diagram showing an example of a control when a terminal hands over from a source cell to a target cell.
Figure 5B:
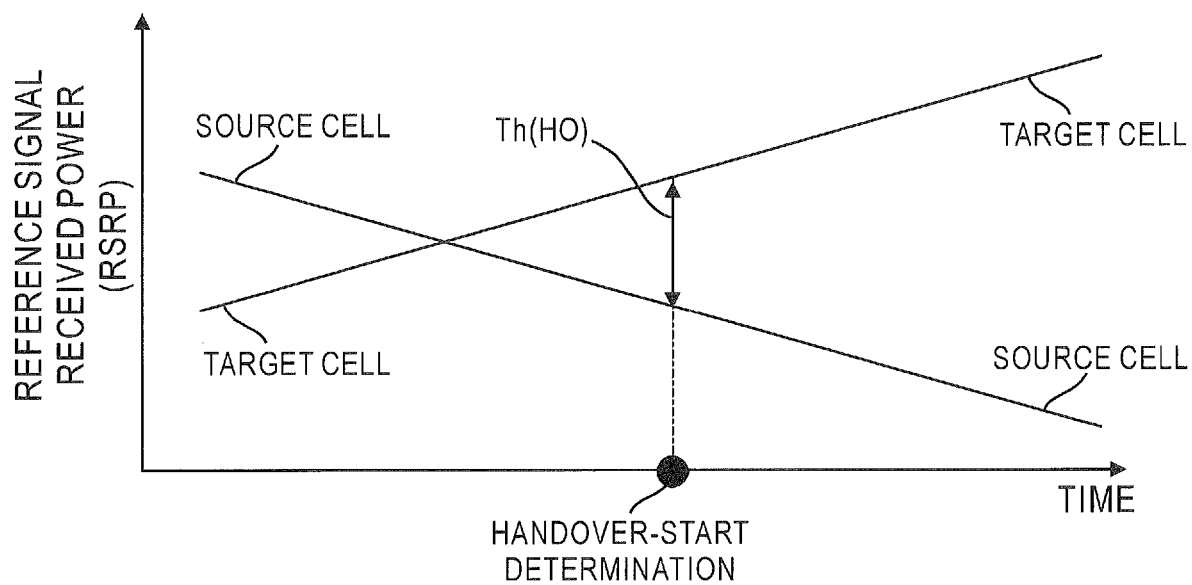
FIG. 5B is a graph showing a temporal change of a reference signal received power (RSRP) in a terminal when controlling a handover.

FIG. 5A is a sequence diagram showing an example of a control when the terminal 30 hands over from the source cell 10A to the target cell 20A. FIG. 5B is a graph showing a temporal change of the reference signal received power (RSRP) in the terminal 30 when controlling the handover. It is noted that, the illustrated example is an example of a hard handover (Hard HO) adopted in the LTE/LTE-Advanced, in which there is one cell to be connected for communication.

In FIGS. 5A and 5B, the terminal 30 sends a measurement result report (MR: Measurement Report) including the information on a handover-destination candidate cell to the source cell base station 10 in connection. Based on the measurement result report (MR) received from the terminal 30, the source cell base station 10 performs a handover-start determination process for monitoring whether a received power difference $\Delta S(=S2-S1)$ between the received power (RSRP: Reference Signal Received Power) S2 of the reference signal transmitted from the target cell base station 20 as a neighboring base station and the received power (RSRP) S1 of the reference signal transmitted from the own base station (first base station) 10 becomes a predetermined threshold value Th(HO) (also called "A3offset" or "handover margin").

In the foregoing handover-start determination process, the source cell base station 10 starts a handover process when the received power difference $\Delta S$ becomes larger than the predetermined threshold value Th(HO). It is noted that, the source cell base station 10 may start the handover process when a state in which the received power difference $\Delta S$ is larger than the predetermined threshold Th(HO) continues for a predetermined monitoring period (TTT: Time-To-Trigger).

Upon starting the handover process, for example, based on the measurement result report (MR) received from the terminal 30, the source cell base station 10 transmits a handover request and information on the terminal 30 to be handed over to the target cell base station 20 as the handover destination via the core network and sets it. Upon receiving a handover request response from the target cell base station 20, the source cell base station 10 transmits a handover instruction (HO Command) for cell movement to the terminal 30 so that the terminal 30 disconnects the communication with the source cell base station 10. Upon receiving the handover instruction, the terminal 30 transmits a handover completion to the target cell base station 20 at the handover destination, and starts a communication with the target cell base station 20, thereby the handover is completed.

Since the terminal 30 performing the handover is located in the cell boundary area between the cell 10A and the cell 20A as described above, the terminal 30 may receive a downlink radio signal transmitted from the target cell base station 20 as an interference signal (interference wave). If there is an interference from the target cell 20A to the source cell 10A, the downlink (DL) signal (for example, the above-described data signal and control signal) is not received and the handover may fail. When the value of the threshold Th(HO) is set small in order to alleviate this handover failure, there is a fear that the reference signal received power (RSRP) of the source cell 10A and the reference signal received power (RSRP) of the target cell 20A are competed with each other, a ping-pong handover phenomenon which repeats a handover occurs, which may lead to an increase of load in the system and an unnecessary handover. As a result of examination on such a handover failure and ping-pong handover phenomenon by the present inventors, it was found that an interference caused by a signal (for example, the aforementioned data signal and control signal) other than the downlink reference signal transmitted from the target cell base station 20 to the downlink signal (for example, the aforementioned data signal and control signal) of the source cell 10A during the handover-start determination process is greatly affected. Therefore, in the present embodiment, by controlling a transmission of a signal from the target cell base station 20 during the foregoing handover determination process as described below, the handover failure and the ping-pong handover phenomenon due to the interference from the target cell 20A to the source cell 10A are prevented.

Hereinafter, the handover control in the mobile communication system according to the present embodiment will be described.

Figure 6A:
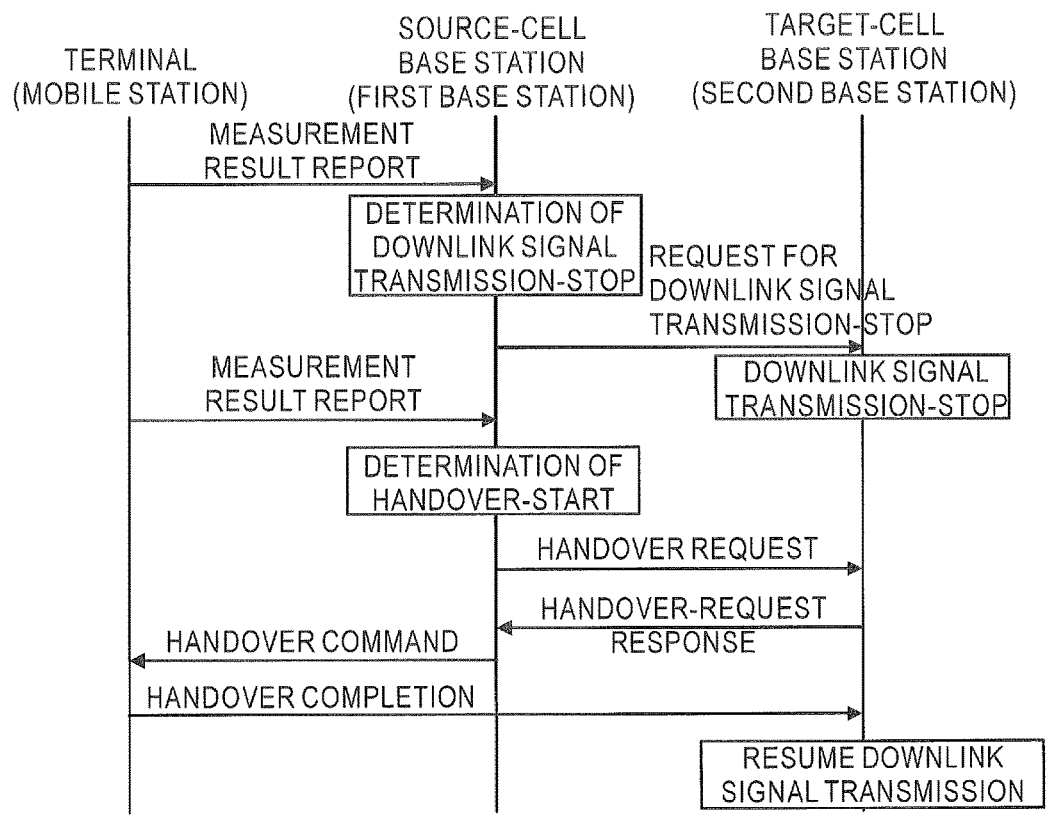
FIG. 6A is a sequence diagram showing an example of a handover control in a mobile communication system according to the present embodiment.
Figure 6B:
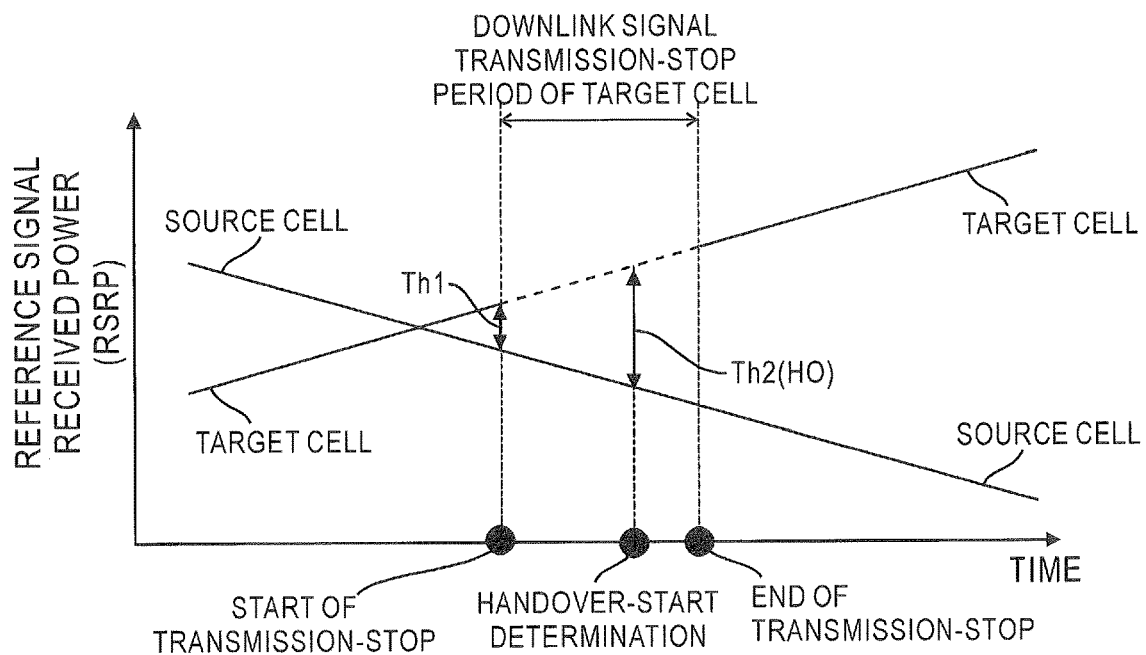
FIG. 6B is a graph showing an example of a temporal change in reference signal received power (RSRP) received from each of a source cell and a target cell when controlling a handover.

FIG. 6A is a sequence diagram showing an example of the handover control in the mobile communication system according to the present embodiment, and FIG. 6B is a graph showing an example of the temporal change in the reference signal received power (RSRP) received from each of the source cell 10A and the target cell 20A when controlling the handover of FIG. 6A. It is noted that, in FIG. 6A and FIG. 6B, the description of parts common to those in FIG. 5A and FIG. 5B will be omitted.

In FIGS. 6A and 6B, based on the measurement result report (MR) received from the terminal 30, when the received power difference $\Delta S (=S2-S1)$ between the received power (RSRP): S2 of the reference signal transmitted from the target cell base station 20 and the received power (RSRP): S1 of the reference signal transmitted from the own base station (first base station) 10 exceeds a predetermined first threshold value Th1 (or becomes equal to or larger than the first threshold value Th1), the source cell base station 10 determines that both of the received powers S1 and S2 are competed with each other and transmits a downlink signal transmission-stop request that instructs to stop the transmission of the downlink signal from the target cell base station 20, to the target cell base station 20. It is noted that, as a parameter for setting the first threshold value Th1, an "A3offset" may be diverted, which is a parameter for setting a threshold value when determining a conventional handover start.

The target cell base station 20 starts to stop the transmission of the downlink signal from the target cell base station 20 based on the downlink signal transmission-stop request received from the source cell base station 10.

After starting to stop the transmission of the downlink signal from the target cell base station 20, the source cell base station 10 starts the handover start determination process and monitors whether the aforementioned received power difference $\Delta S$ exceeds a predetermined second threshold value Th2(HO) (or becomes equal to or larger than the second threshold value Th2(HO)) based on the measurement result report (MR) received from the terminal 30.

When the received power difference $\Delta S$ exceeds the second threshold value Th2(HO) (or becomes equal to or larger than the second threshold value Th2(HO)), the source cell base station 10 transmits a handover request to the target cell base station 20. Upon receiving the handover request response from the target cell base station 20, the source cell base station 10 transmits a handover instruction (HO Command) to the terminal 30. When receiving the handover instruction, the terminal 30 transmits a handover completion to the target cell base station 20 at the handover destination and starts a communication with the target cell base station 20, thereby the handover is completed.

When the handover of the terminal 30 to the cell 20A of the own base station 20 is completed, the target cell base station 20 resumes the transmission of the downlink signal. When a plurality of terminals are connected to the own base station and the transmission of the downlink signals is stopped for the plurality of terminals, the target cell base station 20 may terminate the transmission stop of the downlink signals and resume the transmission of the downlink signals with respect to the radio resources allocated to the terminal 30 in which the handover process has been completed among the plurality of terminals, rather than the whole of the plurality of terminals.

According to the control example of FIGS. 6A and 6B, since the transmission of the signal from the target cell base station 20 is stopped during the handover start determination process, the handover can be performed after surely generating the received power difference while maintaining the communication quality without undergoing the interference of the downlink signal from the target cell 20 A, so that the handover start of the terminal 30 can be determined without the occurrence of the ping-pong handover phenomenon.

It is noted that, in the control example of FIGS. 6A and 6B, although the received power difference $\Delta S$ is used for determining whether the transmission stop of the downlink signal from the target cell base station 20 is performed, the received quality (for example, SINR value) of the downlink signal from the source cell base station 10 in the terminal 30 may be used. For example, when the SINR value, which is an index value of the received quality of the downlink signal from the source cell base station 10 in the terminal 30, falls below a predetermined fourth threshold value Th4 (or becomes equal to or lower than the fourth threshold value Th4), the transmission stop of the signal from the second base station may be started. When the received power difference $\Delta S$ exceeds the predetermined first threshold value Th1 (or becomes equal to or larger than the first threshold value Th1) and the SNIR value is lower than the predetermined fourth threshold value Th4 (or becomes equal to or lower than the fourth threshold value Th4), the transmission stop of the downlink signal from the target cell base station 20 may be started.

Figure 7:
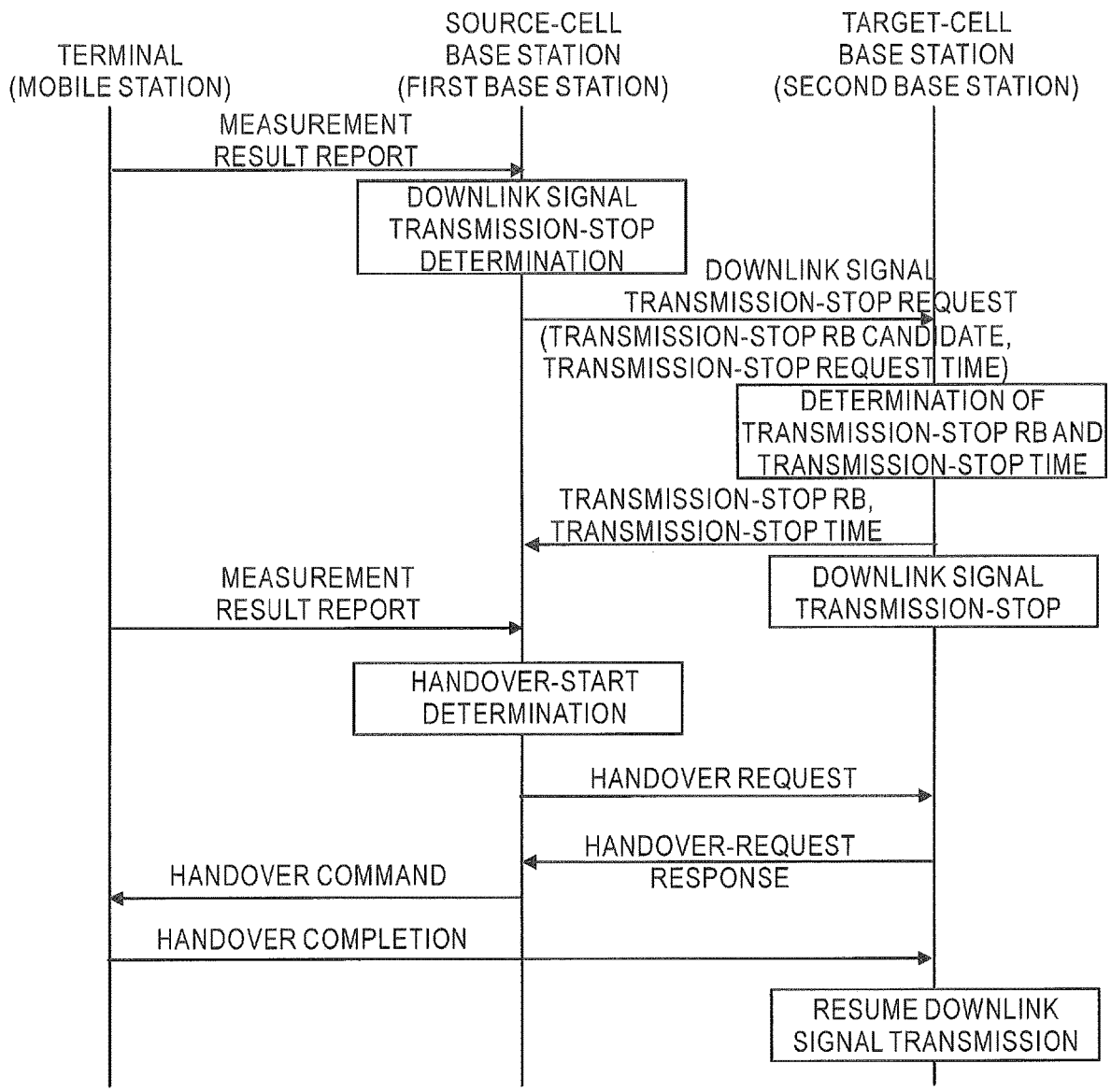
FIG. 7 is a sequence diagram showing another example of a handover control in a mobile communication system according to the present embodiment.

FIG. 7 is a sequence diagram showing another example of the handover control in the mobile communication system according to the present embodiment. It is noted that, in FIG. 7, the description of parts common to those in FIG. 5A and FIG. 6A will be omitted.

In the control example of FIG. 7, when the source cell base station 10 transmits a signal-transmission-stop request to the target cell base station 20, the source cell base station 10 notifies the target cell base station 20 so as to designate at least one of the resource block (RB) candidates for stopping the signal transmission in the target cell base station 20 and a transmission-stop request time for stopping the signal transmission. The resource block (RB) candidates for stopping transmission of the signal may be an arbitrary range of time and frequency.

It is noted that, in the example of FIG. 7, although the notification is performed so as to designate both of the resource block (RB) candidate for stopping signal transmission and the transmission-stop request time, it may be notified to designate either one of the resource block (RB) candidate and the transmission-stop request time. The resource block (RB) candidate may be a radio resource amount such as the number of RBs per one subframe used for signal stop, or identification information (for example, information capable of identifying the number of RBs on the radio resource) of the RB used for stopping the downlink signal in the radio resource.

The target cell base station 20 determines at least one of resource blocks (RBs) for stopping the signal transmission and a transmission-stop time for stopping the transmission of the downlink signal based on the notification information received from the source cell base station 10, and notifies the determined information to the source cell base station 10. The resource block (RB) for stopping the transmission of the signal, which is determined by the target cell base station 20, may be continuous resource blocks on the frequency axis or discontinuous resource blocks on the frequency axis.

The source cell base station 10 transmits a handover command requesting a handover to the target cell 20A to the terminal 30, by using a resource block (RB) in which the target cell base station 20 stops the transmission of the downlink signal. In this way, by transmitting the handover command to the terminal 30 using the resource block in which the transmission of the signal is stopped, it is possible to communicate with the terminal 30 without being affected by the signal interference of the target cell 20A.

It is noted that, in the example of FIG. 7, although both of the resource block (RB) for stopping the transmission of the downlink signal and the transmission-stop request time are determined, either one of the resource block (RB) and the transmission-stop request time may be determined and an initial value may be used as the other. Furthermore, the resource blocks (RBs) for stopping transmission of the signal determined by the target cell base station 20 may be continuous resource blocks on the frequency axis so that the control of signal transmission stop is simplified, or may be discontinuous resource blocks on the frequency axis to ensure a frequency diversity.

Figure 8A:
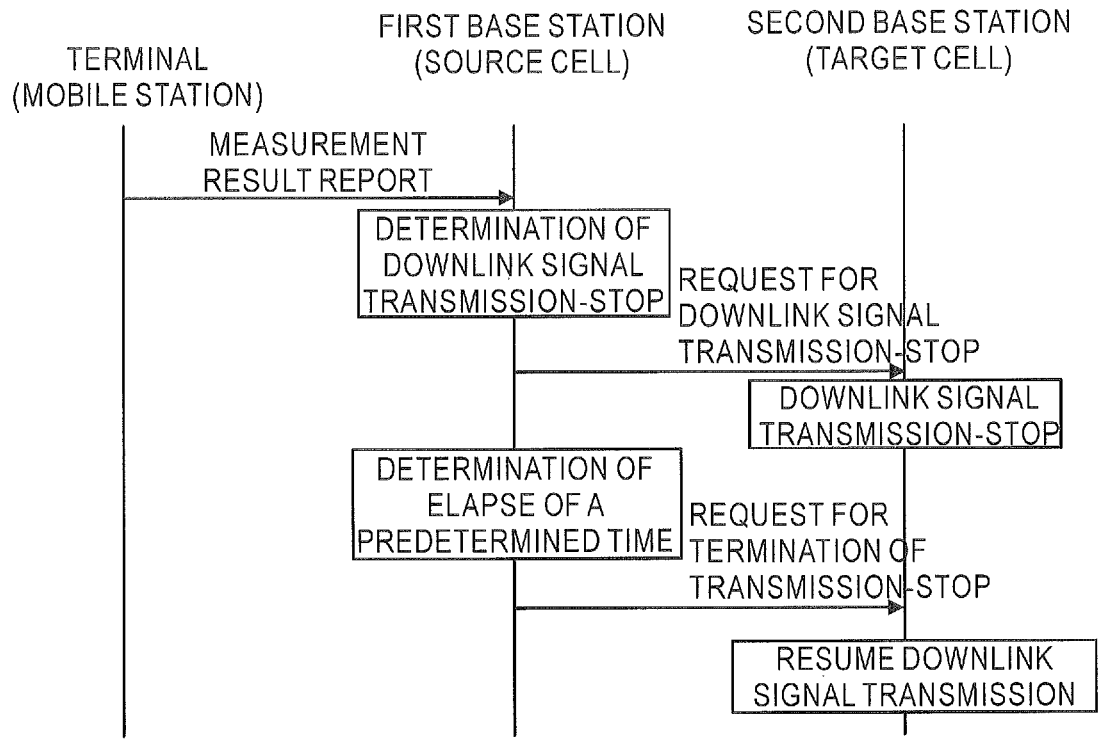
FIG. 8A is a sequence diagram showing another example of a handover control in a mobile communication system according to the present embodiment.
Figure 8B:
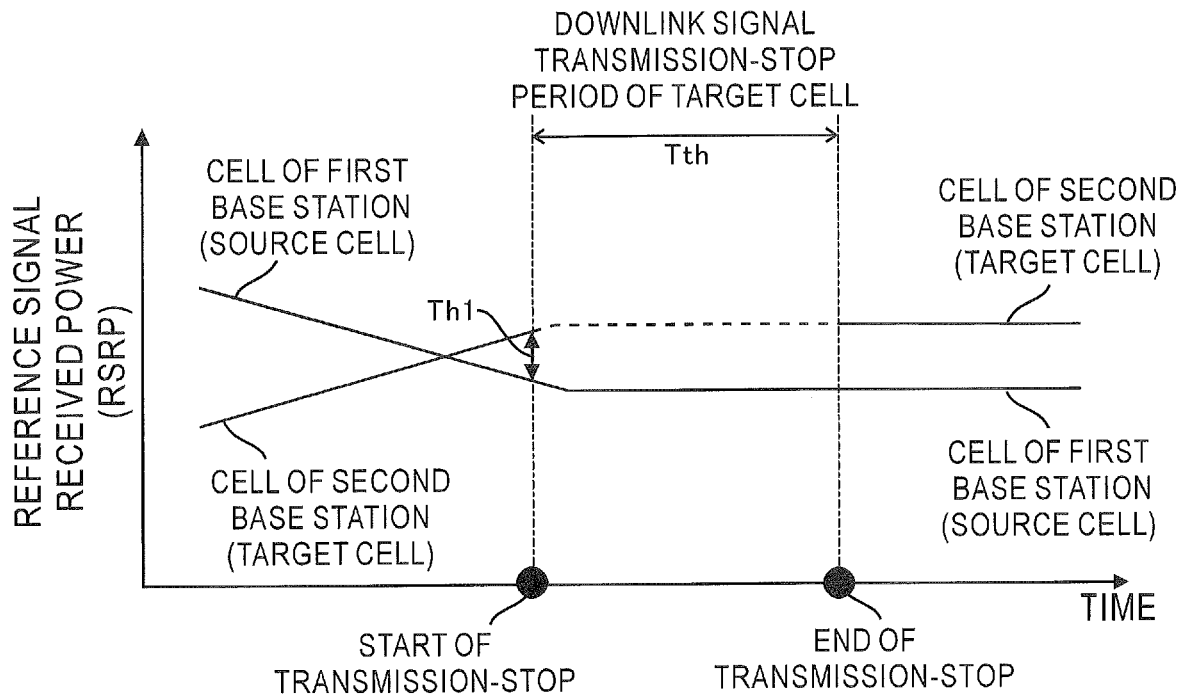
FIG. 8B is a graph showing an example of a temporal change in reference signal received power (RSRP) received from each of a source cell and a target cell when controlling a handover.

FIG. 8A is a sequence diagram showing another example of the handover control in the mobile communication system according to the present embodiment, and FIG. 8B is a graph showing an example of the temporal change in the reference signal received power (RSRP) received from each of the source cell 10A and the target cell 20A when controlling the handover of FIG. 8A. The example in FIGS. 8A and 8B is a control example in the case where the terminal 30 does not enter the target cell 20A from the cell boundary area but moves in a vicinity of the cell boundary area. It is noted that, in FIG. 8A and FIG. 8B, the description of parts common to those in FIG. 5 and FIG. 6 will be omitted.

In FIG. 8A and FIG. 8B, after transmitting the signal-transmission-stop request to the target cell base station 20, the source cell base station 10 does not transmit the handover request to the target cell base station 20 because the received power difference $\Delta S$ does not exceed the first threshold value Th1 (or does not become equal to or larger than the first threshold value Th1). Therefore, the handover of the terminal 30 is not performed.

The source cell base station 10 measures a time elapsed from the time when the signal-transmission-stop request is transmitted to the target cell base station 20 by the timer. When a predetermined time Tth1 (the first time threshold value) has elapsed without an occurrence of the handover, the source cell base station 10 transmits to the second base station a transmission-stop termination request that instructs the termination of the transmission stop of the signal from the target cell base station 20. The target cell base station 20 resumes the transmission of the signal that was stopped, based on the transmission-stop termination request received from the source cell base station 10. When a plurality of terminals are connected to the target cell base station 20 and the transmission of the downlink signals is stopped for the plurality of terminals, the target cell base station 20 may terminate the transmission stop of the downlink signal and resume the transmission of the downlink signal with respect to the radio resources allocated to the terminal of which the predetermined time Tth1 has elapsed from the start of the transmission stop of the downlink signal among the plurality of terminals, rather than the whole of the plurality of terminals.

Figure 14:
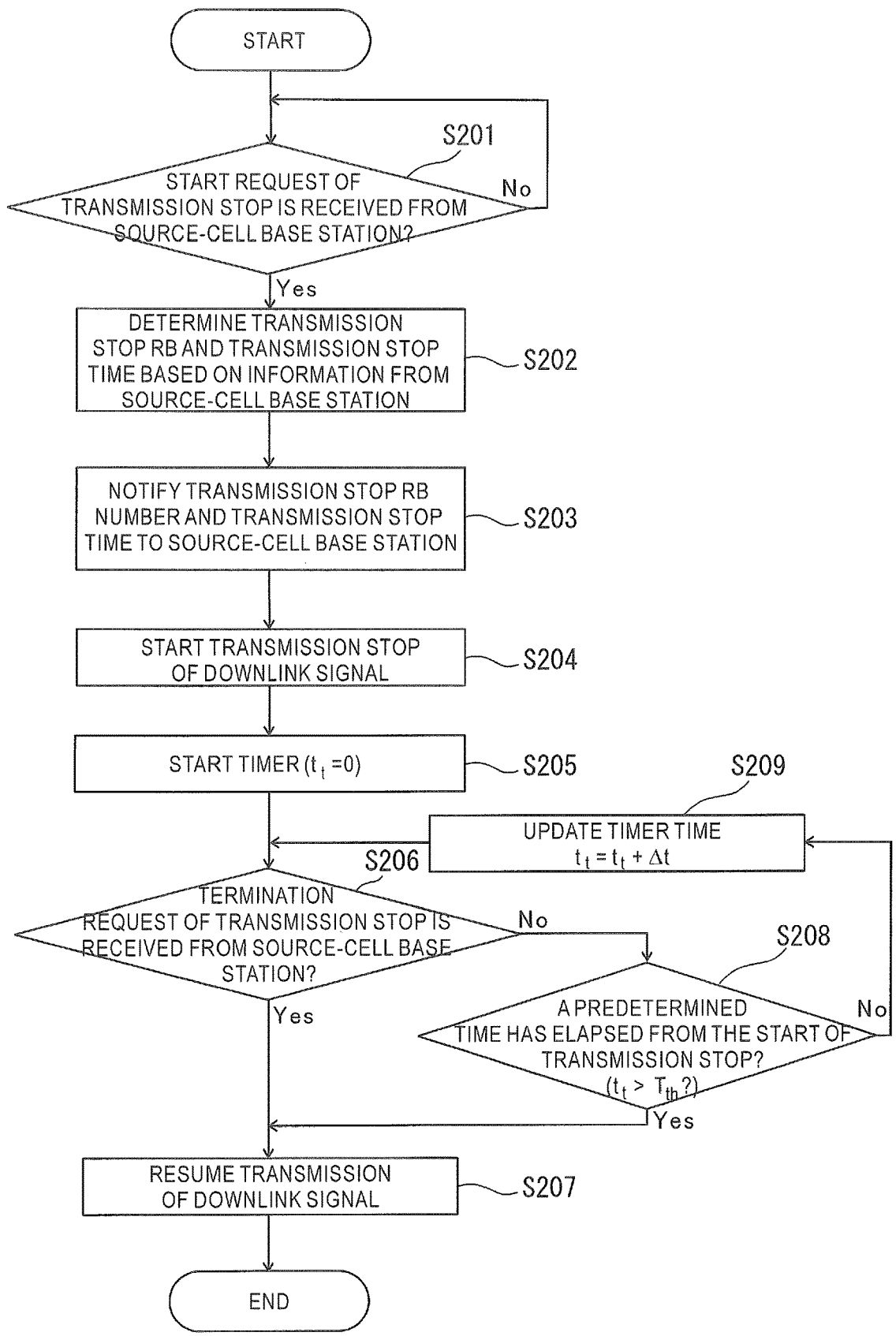
FIG. 14 is a flowchart showing a main part of a control example when controlling a handover in a target cell base station of a mobile communication system according to the present embodiment.

It is noted that, as shown in FIG. 14 described below, the target cell base station 20 may measure the elapsed time from the time when the signal transmission stop is started by the timer, and when the predetermined time Tth1 elapses without an occurrence of the handover, the transmission of the stopped signal may be resumed.

Figure 9A:
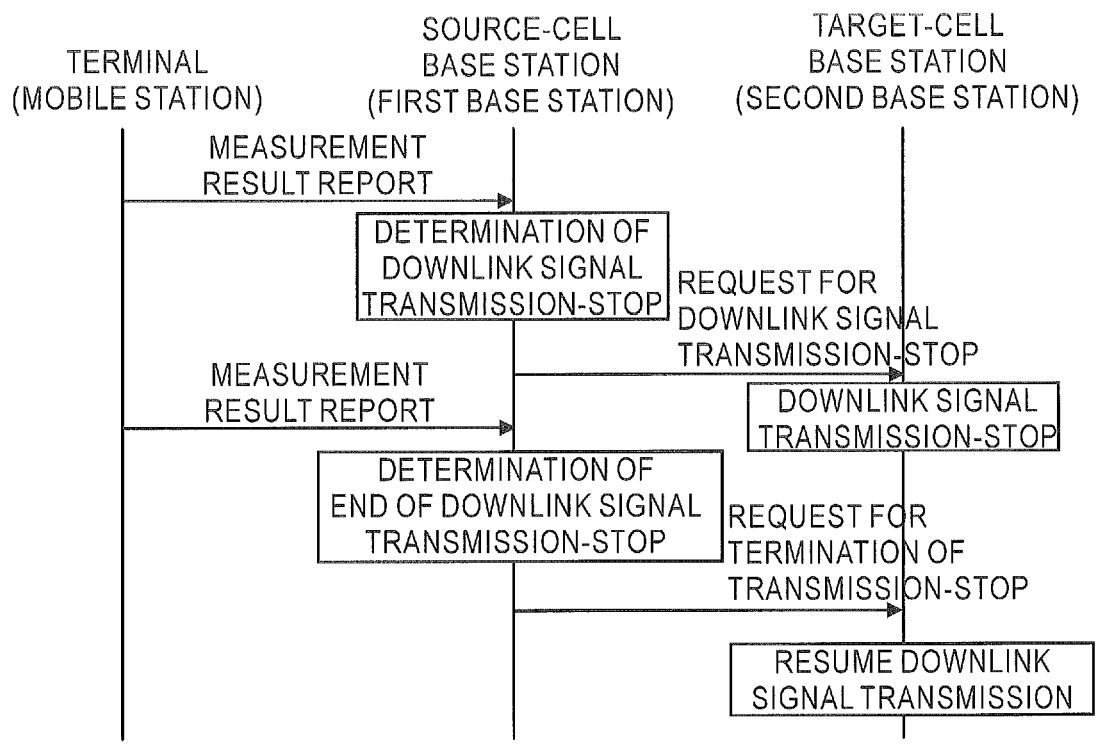
FIG. 9A is a sequence diagram showing yet another example of a handover control in a mobile communication system according to the present embodiment.
Figure 9B:
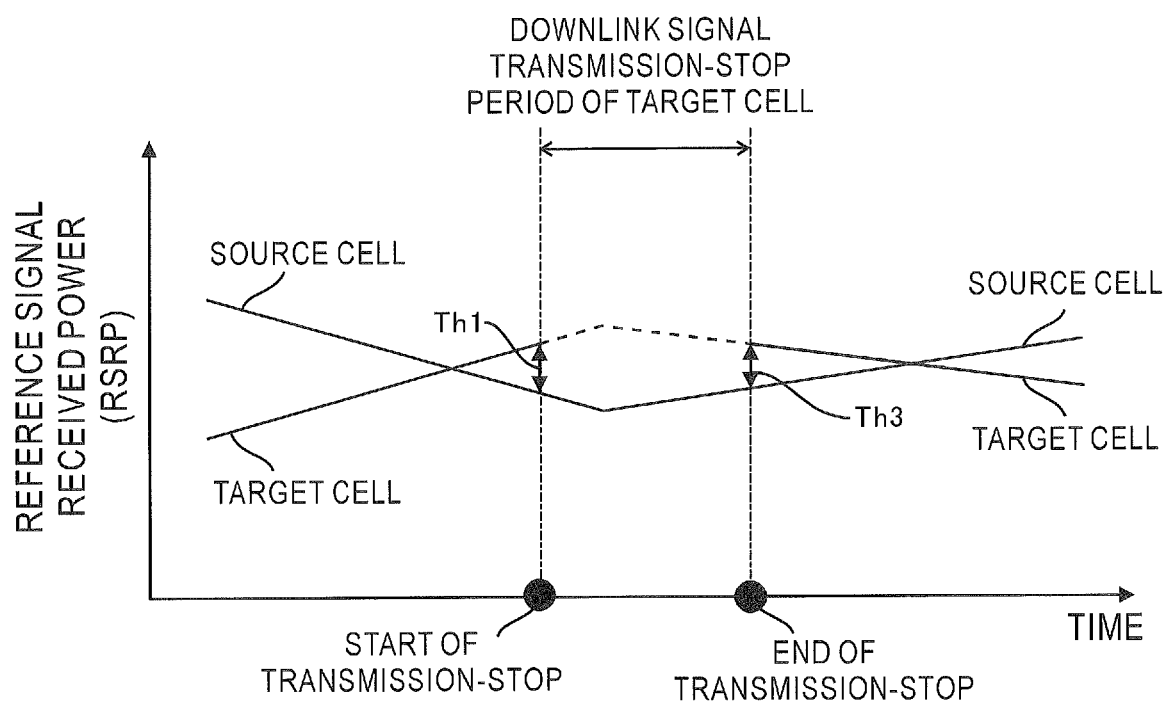
FIG. 9B is a graph showing an example of a temporal change in reference signal received power (RSRP) received from each of a source cell base station and a target cell base station when controlling a handover.

FIG. 9A is a sequence diagram showing yet another example of the handover control in the mobile communication system according to the present embodiment, and FIG. 9B is a graph showing an example of temporal change in the reference signal received power (RSRP) received from each of the source cell 10A and the target cell 20A when controlling the handover of FIG. 9A. The example of FIGS. 9A and 9B is a control example in the case where the terminal 30 does not enter the target cell 20A from the cell boundary area and returns to the inside of the source cell 10A. It is noted that, in FIG. 9A and FIG. 9B, the description of parts common to those of FIG. 5 and FIG. 6 will be omitted.

In FIGS. 9A and B, after transmitting the downlink signal transmission-stop request to the target cell base station 20, the source cell base station 10 does not transmit the handover request to the target cell base station 20 because the received power difference $\Delta S$ does not exceed the first threshold value Th1 (or does not become equal to or larger than the first threshold value Th1). Therefore, the handover of the terminal 30 is not performed. In the present example, after the handover start determination process is started, since the terminal 30 returns to the source cell 10A, the received power (RSRP) of the reference signal from the source cell base station 10 increases and the received power (RSRP) of the reference signal from the target cell base station 20 decreases. Therefore, the received power difference ΔS decreases without an occurrence of handover.

After transmitting the downlink signal-transmission-stop request to the target cell base station 20, when the received power difference ΔS becomes lower than a predetermined third threshold Th3 (or becomes equal to or lower than the third threshold value Th3), the source cell base station 10 transmits a termination request of transmission stop to the target cell base station 20 to instruct the termination of the transmission stop of the signal from the target cell base station 20. The target cell base station 20 resumes the transmission of the signal from the target cell base station 20 based on the termination request of transmission stop received from the source cell base station 10. When a plurality of terminals are connected to the own base station and the transmission of the downlink signals is stopped for the plurality of terminals, the target cell base station 20 may terminate the transmission stop of the downlink signal and resume the transmission of the downlink signal with respect to the radio resources allocated to the terminal in which the received power difference ΔS is lower than the predetermined third threshold value Th3 (or becomes equal to or less than the third threshold value Th3) among the plurality of terminals, rather than the whole of the plurality of terminals.

It is noted that, in the case when the handover is not performed, the transmission resumption of the signal from the target cell base station 20 may be determined based on a prediction result of the received quality (for example, SINR value) of the downlink signal from the source cell base station 10 in the terminal 30. For example, in case of expecting that the interference with the downlink signal from the source cell base station 10 in the terminal 30 when the transmission of the signal from the target cell base station 20 is resumed is small and the communication quality will be improved, the terminal 30 can continuously communicate in the source cell 10 A without receiving an interference from the neighboring cell. The received quality (for example, SINR value) γ, in the terminal 30, which reflects the interference when the transmission of the signal from the target cell base station 20 is resumed, can be predicted by correcting the received quality (for example, SINR value) of the downlink signal from the source cell base station 10, which is measured in the terminal 30 during stopping the transmission of the signal from the target cell base station 20.

For example, the SINR value γ as an index value of the received quality from the source cell 10A in the terminal 30 when resuming the signal transmission can be predicted by calculating with the following expression (1). In the expression (1), S is the received power from the source cell 10A, $I_j$ is the received power from the neighboring cell including the target cell 20, N is the number of the neighboring cells, and $N_0$ is noise.

[Expression 1]

$$\gamma = \frac{S}{N_0 + \sum_{j=1}^{N} I_j} \quad (1)$$

Then, when the SINR value γ is larger than a predetermined fifth threshold value Th5 (when the SINR value γ is larger than or equal to the fifth threshold value Th5), the source cell base station 10 may instruct the target cell base station 20 to resume the transmission of the downlink signal. When a plurality of terminals are connected to the own base station and transmission of the downlink signals is stopped for the plurality of terminals, the target cell base station 20 may terminate the transmission stop of the downlink signal and resume the transmission of the downlink signal with respect to the radio resource allocated to the terminal which the SINR value γ is larger than the predetermined fifth threshold value Th5 (equal to or more than the fifth threshold value Th5) among the plurality of terminals, rather than the whole of the plurality of terminals.

Figure 10:
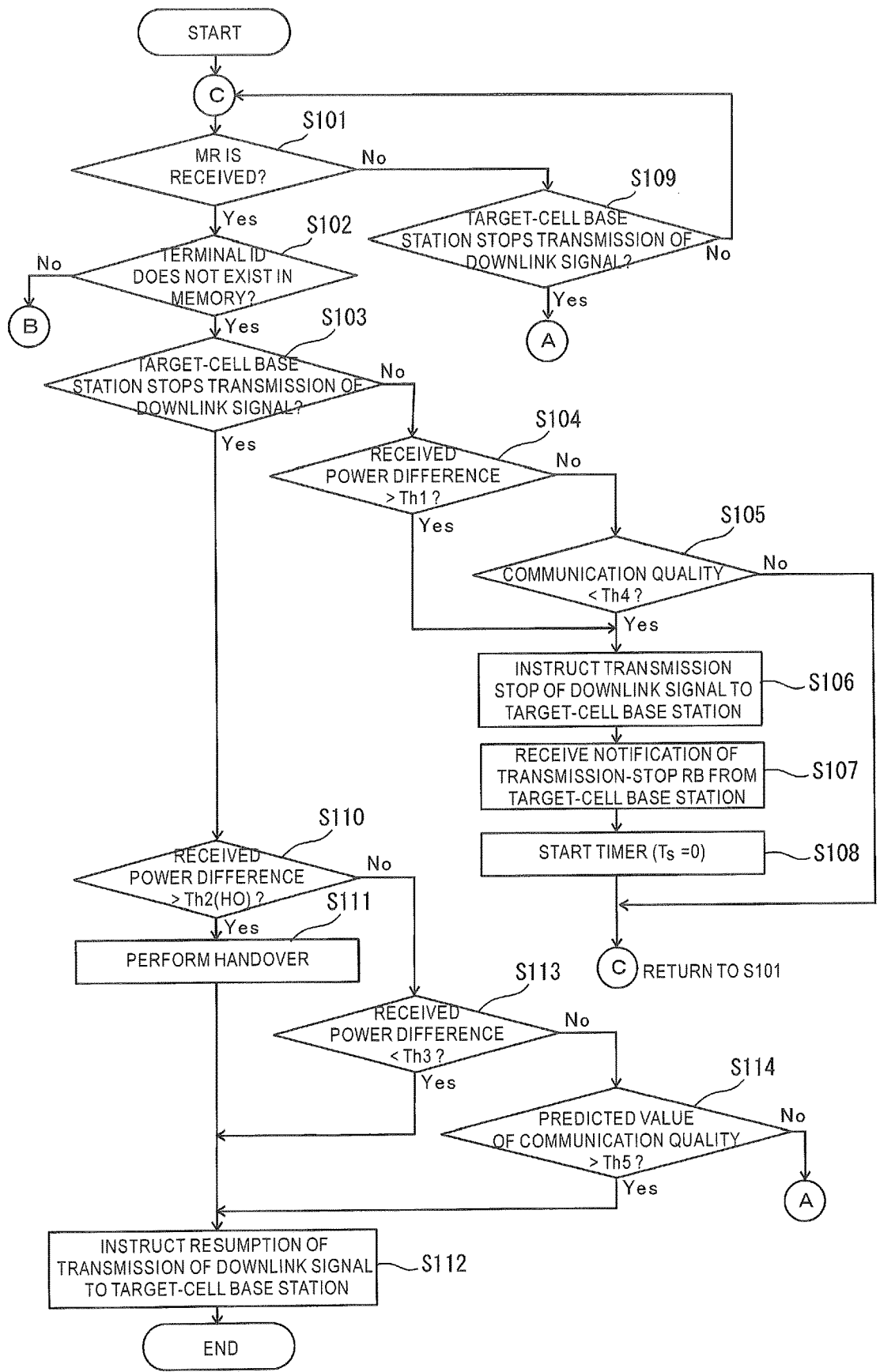
FIG. 10 is a flowchart showing a main part of a control example when controlling a handover in a source cell base station of a mobile communication system according to the present embodiment.
Figure 11:
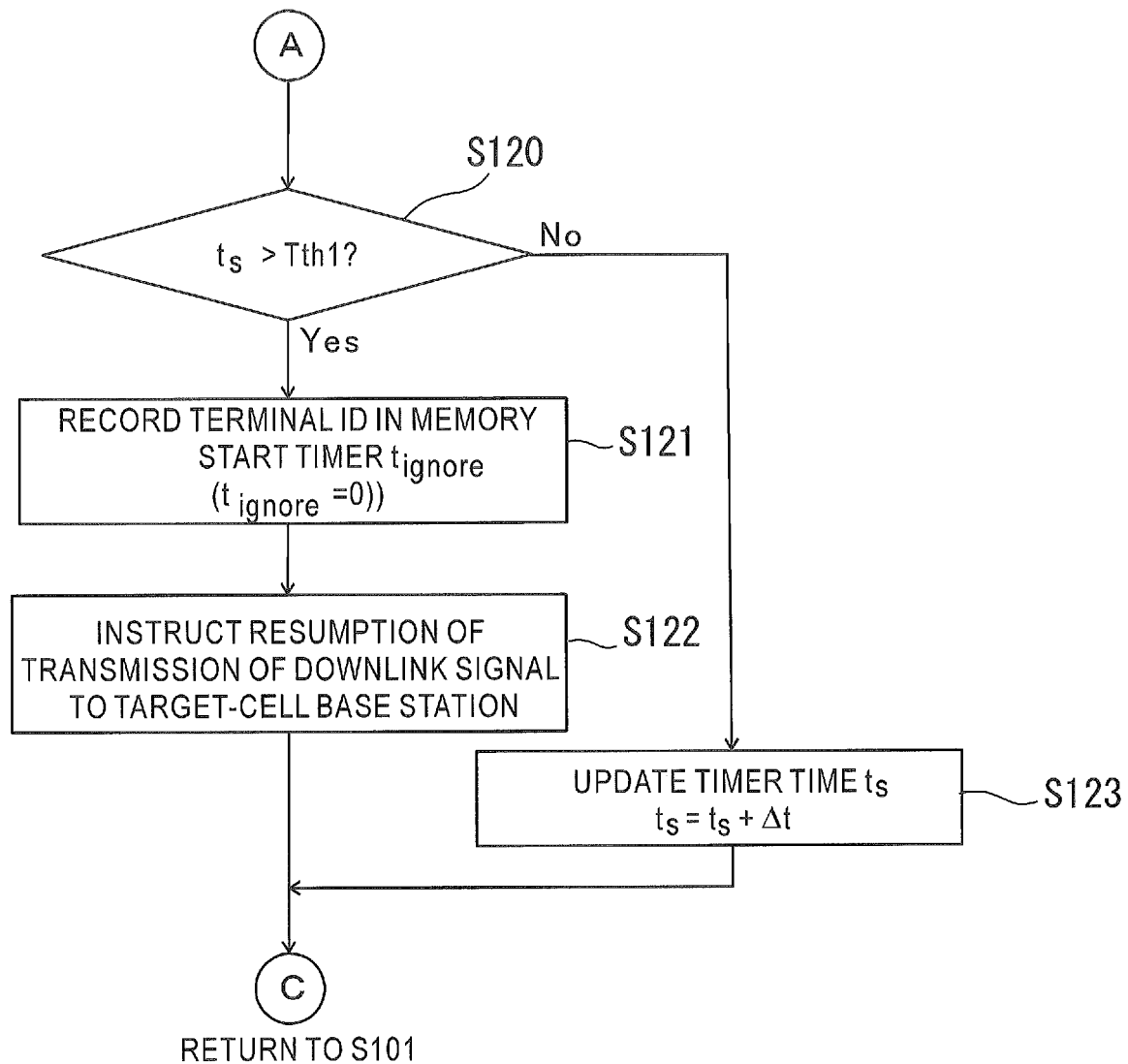
FIG. 11 is a flowchart showing a part of the control example when controlling the handover.
Figure 12:
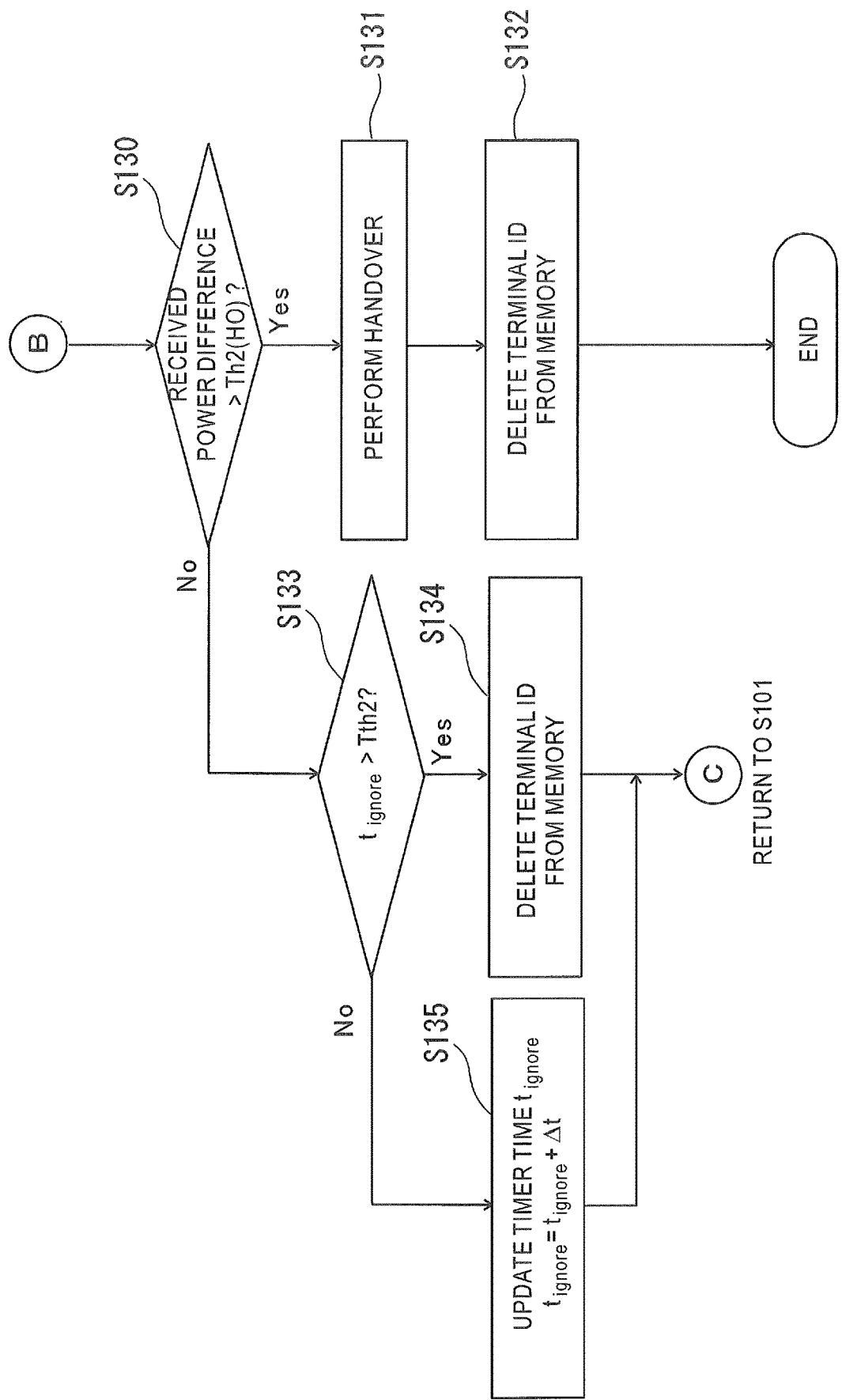
FIG. 12 is a flowchart showing another part of the control example when controlling the handover.

FIG. 10 to FIG. 12 are flowcharts showing examples of control when controlling the handover in the first base station of the source cell of the mobile communication system according to the present embodiment.

In FIG. 10, the terminal 30 measures the received powers S1 and S2 from each of the source cell 10A and the target cell 20A, when the received power difference ΔS(=S2−S1) satisfies Δ>Th1 (=A3offset), the terminal 30 transmits the Measurement Report (MR) to the source cell base station 10 periodically (S101). When the source cell base station 10 receives the MR from the terminal 30, the process proceeds to the determination of S102.

Next, the source cell base station 10 determines whether a terminal ID of the terminal that transmits the MR exists in a memory of the own base station (S102). In this step, when the terminal ID exists in the memory (No in S102), the process proceeds to the processing of FIG. 12 described below so as not to instruct the target cell base station 20 to stop the signal transmission. On the other hand, when the terminal ID does not exist in the memory (Yes in S102), the process proceeds to the determination in the next S103.

Next, the source cell base station 10 determines whether the transmission of the signal of the target cell 20A is stopped (S103). In this step, when the transmission of the signal is not stopped (No in S103), the process proceeds to the determination of S104 in order to request the target cell base station 20 to stop the transmission of the downlink signal. On the other hand, when the transmission of the signal has been stopped (Yes in S103), since the source cell base station 10 makes a decision to resume signal transmission, the process proceeds to the determination of S110 to perform the determination to resume the signal transmission.

In the step S104, the source cell base station 10 calculates the received power difference ΔS(=S2−S1) of the received powers S1 and S2 from each of the source cell 10A and the target cell 20A based on the information in the MR, and determines whether the determination formula of the received power difference ΔS>Th1 is satisfied (S104). When the received power difference ΔS exceeds the first threshold value Th1 (Yes in S104), the stop of signal transmission is instructed to the target cell base station 20 (S106). On the other hand, when the received power difference ΔS does not exceed the first threshold value Th1 (No in S104), the process proceeds to the determination in S105.

In the step S105, the source cell base station 10 determines whether the value of the SINR, which is the index value of the communication quality of the downlink signal in the terminal 30, satisfies SINR<Th4. In this step, when the value of SINR is lower than the fourth threshold value Th4 (Yes in S105), it can be determined that the communication quality is insufficient, the process proceeds to S106, and the stop of signal transmission is instructed to the target cell base station 20. On the other hand, when the value of SINR is equal to or larger than the fourth threshold value Th4 (No in S105), it can be determined that there is no need to stop the signal transmission in the target cell base station 20, and it is waited until the next MR reception.

When the source cell base station 10 instructs the target cell base station 20 to stop the signal transmission (S106), the source cell base station 10 instructs the number of resource blocks (RB) of transmission-stop targets in which the signal transmission is stopped and the transmission-stop time (S107). Then, the source cell base station 10 receives the instruction of the RB number to be used for stopping the signal transmission determined by the target cell base station 20, initializes the timer $t_s$ at the same time as the reception, and starts counting the elapsed time (S108).

It is noted that, in the step S101, when the source cell base station 10 has not confirmed the reception of MR from the terminal 30 (No in S101), the source cell base station 10 determines the transmission state of the signal from the target cell base station 20 (S109).

In this step, when the transmission of the signal from the target cell base station 20 is stopped (Yes in S109), the process proceeds to the determination for resuming the transmission of the signal.

In the step S110, the source cell base station 10 determines whether the received power difference $\Delta S(=S2-S1)$ of the received powers S1 and S2 from each of the source cell 10A and the target cell 20A satisfies the determination formula of $\Delta S>Th2(HO)$, based on the information in the MR. In this step, when the received power difference $\Delta S$ is larger than the second threshold value Th2(HO) (Yes in S110), the handover is immediately performed (S111), and after the end of the handover, an instruction to resume the downlink signal transmission is transmitted to the target cell base station 20 (S112). On the other hand, when the received power difference $\Delta S$ is equal to or less than the second threshold value Th2(HO) (No in S110), the process proceeds to the determination in S113.

In the step S113, the source cell base station 10 determines whether the received power difference $\Delta S$ satisfies the determination formula of $\Delta S<Th3$, based on the information in the MR. In this step, when the received power difference $\Delta S$ is smaller than the third threshold Th3 (Yes in S113), it can be assumed that the probability of handover occurrence has decreased, and an instruction to resume the signal transmission is transmitted to the target cell base station 20 (S112). On the other hand, when the received power difference $\Delta S$ is equal to or larger than the third threshold value Th3 (No in S113), the process proceeds to the determination in S114.

Since the target cell base station 20 stops transmitting the signal, the communication quality in the terminal 30 is enhanced. Therefore, in the above-described S114, the source cell base station 10 predicts the SINR value γ as the index value of the communication quality when the target cell base station 20 is transmitting the downlink signal based on the MR, and determines whether γ>Th5 is satisfied (S114). In this step, when the prediction result of the SINR value γ exceeds the fifth threshold value Th5 (Yes in S114), the source cell base station 10 determines that the communication quality is sufficiently maintained even when transmitting the downlink signal from the target cell base station 20 and transmits an instruction to resume the data-signal transmission to the target cell base station 20 (S112). On the other hand, when the prediction result of the SINR value γ is equal to or less than the fifth threshold value Th5 (No in S114), the process proceeds to the control of FIG. 11.

When neither of the determinations in the steps S110, S113 and S114 satisfies the condition, as shown in FIG. 11, the source cell base station 10 determines the timer $t_s$ (S120). In this step, when ts>Tth1 is satisfied (Yes in S120), the source cell base station 10 records the terminal ID of the terminal 30 that has not handed over until the timer $t_s$ exceeds the first time threshold value Tth1, starts the second timer $t_{ignore}$ (S121), and transmits an instruction to resume the downlink signal transmission to the target cell base station 20 (S122). On the other hand, when ts>Tth1 is not satisfied (No in S120), the timer $t_s$ is incremented by the predetermined time $\Delta t$ (for example, 1 ms) and returns to the beginning (S123).

In the step S102, when the terminal ID of the terminal 30 that transmits the MR exists in the memory (No in S102), it is necessary to make it impossible to instruct the target cell base station 20 to stop the transmission of the downlink signal. However, since it is necessary to make a determination of handover, as shown in FIG. 12, the source cell base station 10 determines whether the received power difference $\Delta S$ of the received power S1 and S2 from each of the source cell 10A and the target cell 20A satisfies the determination formula of $\Delta S>Th2(HO)$, based on the information in the MR (S130). In this step, when $\Delta S>Th2(HO)$ is satisfied (Yes in S130), the handover is immediately executed (S131), and the corresponding terminal ID is deleted from the memory after the end of the handover (S132). On the other hand, when $\Delta S>Th2(HO)$ is not satisfied, that is, when any handover does not occur (No in S130), the process proceeds to the determination in S133.

In the step S133, the source cell base station 10 determines whether the timer $t_{ignore}$ satisfies $t_{ignore}>Tth2$. In this step, when $t_{ignore}>Tth2$ is satisfied, that is, when the timer $t_{ignore}$ has passed the second time threshold Tth2 (Yes in S133), the corresponding terminal ID is deleted from the memory (S134). On the other hand, when $t_{ignore}>Tth2$ is not satisfied (No in S133), the timer $t_{ignore}$ is incremented by the predetermined time $\Delta t$ (for example, 1 ms).

Figure 13:
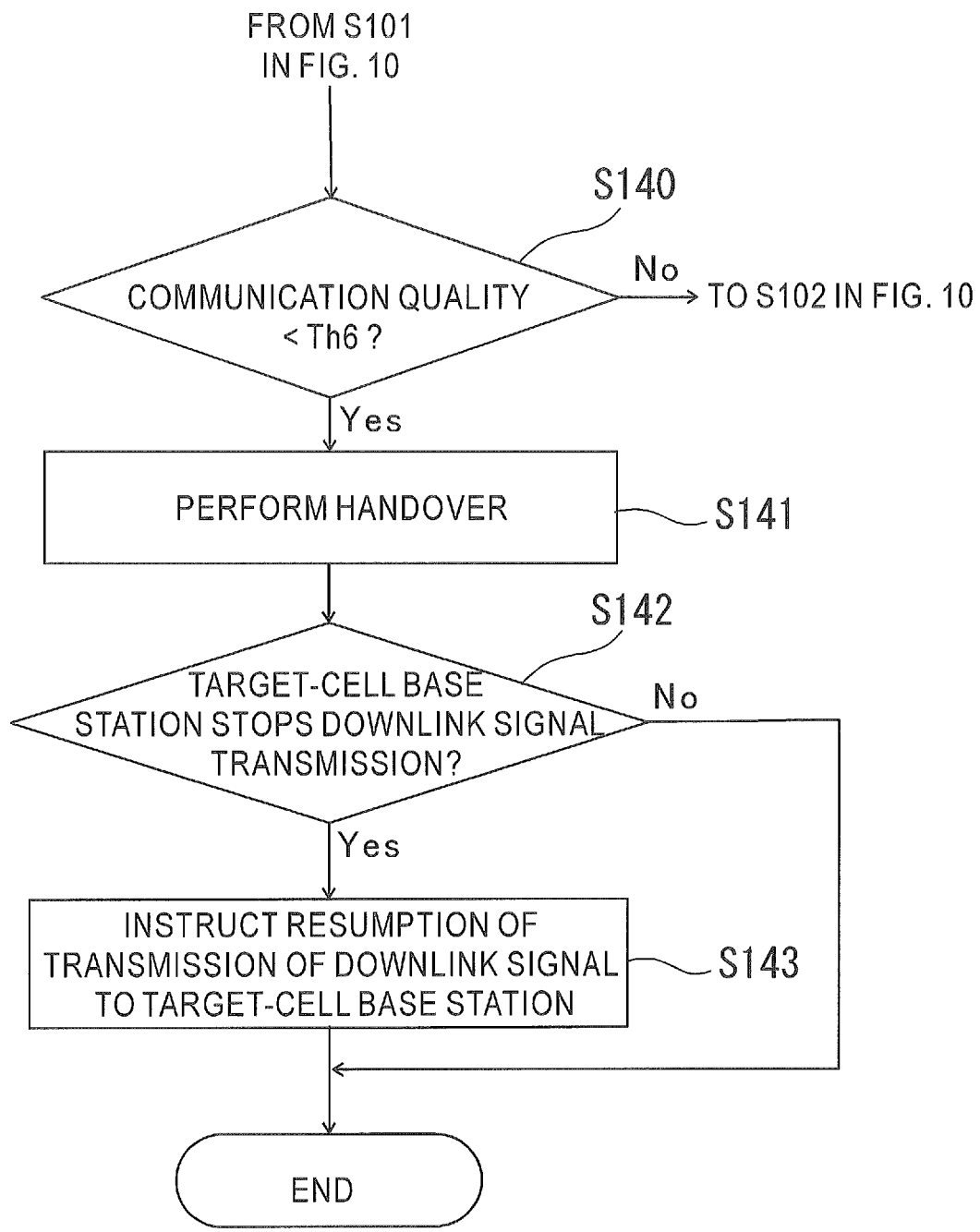
FIG. 13 is a flowchart showing a modified example of a part of the control example when controlling the handover.

FIG. 13 is a flowchart showing a modified example of a part of a control example when controlling the handover in the first base station of the source cell, which is shown in FIG. 10 to FIG. 12. The control example of FIG. 13 is performed by inserting between S101 and S102 of FIG. 10 described above.

In FIG. 13, after receiving the MR from the terminal 30 (Yes in S101), the source cell base station 10 determines whether the communication quality Q1 included in the MR is lower than a predetermined threshold value Thr6 (S140). When the communication quality Q1 is lower than the threshold value Thr6 (Yes in S140), the handover is immediately performed (S141). Then, when the target cell base station 20 has stopped the transmission of the downlink signal (Yes in S142) after stopping the handover, the target cell base station 20 transmits an instruction to resume the downlink signal transmission to the target cell base station 20 (S143). On the other hand, when the communication quality Q1 is not lower than the threshold value Thr6 (No in S140), the process proceeds to the determination in S102 of FIG. 10.

According to the control example of FIG. 13, it is capable of preventing a disconnection in the communication of the terminal 30 by immediately performing the handover when the communication quality Q1 in the terminal 30 is lower than the threshold value Thr6. It is noted that, in S140 of the control example shown in FIG. 13, although it is determined whether the communication quality Q1 is lower than the threshold value Thr6, it may be determined whether the communication quality Q1 is equal to or less than the threshold value Thr6.

FIG. 14 is a flowchart showing a main part of a control example when controlling the handover in the target cell base station 20 of the mobile communication system according to the present embodiment.

In FIG. 14, the target cell base station 20 determines whether a start request of transmission stop that instructs to stop the transmission of the downlink signal has been received from the source cell base station 10 (S201). When the start request of transmission stop is received (Yes in S201), the target cell base station 20 determines a transmission-stop RB number and a transmission-stop time for stopping the signal transmission, based on the information (for example, a resource block (RB) candidate for stopping the signal transmission and the transmission-stop request time) received together with the start request of transmission stop from the source cell base station 10.

Next, the target cell base station 20 notifies the determined transmission-stop RB number and the determined transmission-stop time to the source cell base station 10 (S203), starts the transmission stop of the signal in the determined transmission-stop RB (S204), initializes the timer $t_t$, and starts counting an elapsed time (S205). Thereafter, the target cell base station 20 proceeds to the determination for resuming the signal transmission.

The target cell base station 20 determines whether a termination request of transmission stop of the downlink signal has been received from the source cell base station 10 (S206). When receiving the termination request of transmission stop (Yes in S206), the target cell base station 20 resumes the signal transmission (S207). On the other hand, when the termination request of transmission stop is received (No in S206), the process proceeds to the determination in S208.

When the termination request of transmission stop is not received, the target cell base station 20 determines whether the predetermined time Tth1 has elapsed from the start of transmission stop of the downlink signal based on the count value of a timer $t_t$ of the own base station, that is, determines whether $t_t$>Tth1 is satisfied (S208). In this step, when the predetermined time Tth1 has elapsed from the start of signal transmission stop (when $t_t$>Tth1 is satisfied) (Yes in S208), the target cell base station 20 resumes the signal transmission (S207). On the other hand, when the predetermined time Tth1 has not elapsed from the start of signal transmission stop (when $t_t$>Tth1 is not satisfied) (No in S208), the target cell base station 20 increments the timer $t_t$ by a predetermined time Δt (for example, 1 ms) and returns to the step 206 (S209).

As described above, according to the present embodiment, when the handover determination process for determining the start of handover from the source cell 10A to the target cell 20A is performed, the transmission of the downlink signal from the target cell base station 20, which may interfere with the downlink signal in the source cell 10A used for the handover determination process, is stopped. Accordingly, it is possible to appropriately determine the handover start from the source cell 10A after sufficiently generating the received power difference without receiving the interference of the downlink signal from the target cell 20A and without deteriorating the communication quality. Therefore, it is possible to prevent a handover failure or a ping-pong handover phenomenon caused by the interference from the target cell 20A to be handed over by the terminal 30 to the source cell 10A.

According to the present embodiment, the transmission stop of the signal from the target base station 20 is started based on the received power difference ΔS(=S2−S1) using the received power S2 of the reference signal from the target-cell base station 20 included in the MR received from the terminal 30 and the received power S1 of the reference signal from the source-cell base station 10. By using the information in the MR in this manner, it is unnecessary to separately acquire information in order to determine the start of transmission stop of the downlink signal from the target base station 20.

According to the present embodiment, the transmission stop of the downlink signal from the target cell base station 20 is started based on the received quality (SINR) of the downlink signal from the source cell base station 10 in the terminal 30. Since the interference with the source cell 10A can be grasped more accurately and the transmission stop of the downlink signal from the target cell base station 20 can be started by the received quality (SINR) reflecting the interference from the target cell 20A to the source cell 10A, it is possible to more appropriately determine the start of handover from the source cell 10A while avoiding an unnecessary stop of signal transmission stop in the target cell base station.

According to the present embodiment, the source cell base station 10 transmits a downlink signal-transmission-stop request for requesting the stop of transmission of the downlink signal to the target cell base station 20, and the target cell base station 20 stops the transmission of the downlink signal based on the transmission-stop request from the source cell base station 10. Since the transmission of downlink signal can be stopped based on the downlink signal-transmission-stop request transmitted from the source cell base station 10 to the target cell base station 20 in this manner, it is unnecessary to perform a process of determining whether the transmission of downlink signal is stopped in the target cell base station 20. Furthermore, since the source cell base station 10 that performs a handover start determination processing can determine whether the transmission of downlink signal is stopped, it is possible to more reliably stop the transmission of the downlink signal from the target cell base station 20 when performing the determination process of handover start.

According to the present embodiment, the source-cell base station 10 compares the received power S2 from the target cell base station 20, which is fed back from the terminal 30, with the received power S1 from the source cell base station 10, which is fed back from the terminal 30, when the received power difference (S2−S1) as the difference between the received powers is larger than the predetermined first threshold value (Th1), or larger than or equal to the first threshold value (Th1), that is, when the interference from the target cell 20A to the source cell 10A becomes large, the source-cell base station 10 requests the target cell base station 20 to stop the transmission of the downlink signal. Accordingly, it is possible to more reliably prevent a handover failure and a ping-pong handover phenomenon caused by the interference from the target cell 20A to the source cell 10A.

It is noted that, in the present embodiment, when the received power difference (S2−S1) becomes larger than the predetermined first threshold value (Th1), or becomes larger than or equal to the first threshold value (Th1), and the received quality Q1 fed back from the terminal 30 from the source-cell base station 10 becomes smaller than the predetermined fourth threshold value (Th4), or becomes smaller than or equal to the fourth threshold value (Th4), the stop of transmission of the downlink signal may be requested to the target cell base station 20. In this case, it is possible to accurately graspe the deterioration of the received quality Q1 from the source cell base station 10 due to the interference from the target cell 20A to the source cell 10A and more reliably prevent a handover failure or a ping-pong handover phenomenon caused by the interference.

According to the present embodiment, when the received power difference (S2−S1) becomes smaller than the predetermined first threshold value (Th1), or becomes smaller than or equal to the first threshold value (Th1), and the received quality Q1 from the source cell base station 10, which is fed back from the terminal 30 becomes smaller than the predetermined fourth threshold value (Th4), or becomes smaller than or equal to the fourth threshold value (Th4), the stop of transmission of the downlink signal may be requested to the target-cell base station 20. In this case, when the received quality Q1 from the source cell base station 10 is degraded due to the interference from the target cell 20A to the source cell 10A even though the received power difference (S2−S1) is small, it is possible to more reliably prevent a handover failure or a ping-pong handover phenomenon caused by the interference.

According to the present embodiment, the source-cell base station 10 may not request the transmission stop of the downlink signal only to the target cell base station 20 but may request to the plurality of base stations (hereinafter referred to as "neighboring base station".) located in a vicinity of the source cell base station 10. For example, when the received quality Q1 from the first base station, which is fed back from the terminal 30, becomes smaller than the predetermined threshold value, or becomes smaller than or equal to the threshold value, the source-cell base station 10 compares the received power S2 from the peripheral base station, which is fed back from the terminal 30, with the received power S1 from the source cell base station 10, which is fed back from the terminal 30, and may request the transmission stop of the downlink signal to one or a plurality of neighboring base stations higher in order of the difference (S2−S1) among the plurality of neighboring base stations in which the difference (S2−S1) is larger than the predetermined threshold value, or larger than or equal to the threshold value.

In this case, it is possible to prevent a handover failure or a ping-pong handover phenomenon caused by the interference from the plurality of neighboring cells including the target cell 20A to the source cell 10A.

According to the present embodiment, the source cell base station 10 notifies the target cell base station 20 of at least one of the resource block candidates for stopping the transmission of the downlink signal and the transmission-stop request time for stopping the transmission of the signal. By notifying the resource block candidate, it is possible to more reliably prevent the interference with the source cell 10A, so that the start of handover from the source cell 10A can be determined more appropriately. In addition, by the notification of the transmission-stop request time, the transmission of the downlink signal from the target cell base station 20 can be more reliably stopped during the period when the source cell base station 10 performs the handover-start determination process.

According to the present embodiment, by determining at least one of radio resources (for example, resource blocks) for stopping the transmission of the downlink signal and a transmission-stop time for stopping the transmission of the downlink signal by the target cell base station 20, the transmission of the downlink signal from the target cell base station 20 can be stopped by considering the status of communication with another terminal connected to the target cell.

According to the present embodiment, by notifying at least one of the determined radio resources (for example, resource blocks) and the transmission-stop time to the source base station 10 by the target cell base station 20, the source-cell base station 10 can transmit a handover command to the terminal 30 by using the resource block in which the downlink signal from the target cell base station 20 is stopped, and transmit the handover command within the period of signal stop. In addition, by allocating the radio resources notified from the target cell base station 20 or the radio resource partially including the notified radio resources as the radio resource used for the downlink signal to the terminal 30, the source cell base station 10 can improve the communication quality of the downlink signal to the terminal 30.

According to the present embodiment, when the resource blocks for stopping the transmission of the downlink signal are continuous resource blocks on the frequency axis, the transmission-stop control of the downlink signal can be simplified.

In addition, when the resource blocks for stopping the transmission of the downlink signal is discontinuous resource blocks on the frequency axis, the frequency diversity can be ensured.

According to the present embodiment, by transmitting the handover command to the terminal 30 using the resource block in which the target cell base station 20 stops the transmission of the downlink signal, the source-cell base station 10 can suppress the occurrence of error in transmitting and receiving a handover command.

According to the present embodiment, by performing the handover immediately when the communication quality Q1 in the terminal 30 is lower than the predetermined threshold value Thr6, the source-cell base station 10 can prevent the disconnection of communication of the terminal 30.

Furthermore, according to the present embodiment, by terminating the transmission stop of the downlink signal when the handover process from the source cell 10A to the target cell 20A is completed, the target-cell base station 20 can prevent a decrease of spectral efficiency and a decrease of throughput in the target cell 20A after completing the handover.

According to the present embodiment, by terminating the transmission stop of the downlink signal when the predetermined time has elapsed from the start of signal transmission in the own base station, the target cell base station 20 can prevent the decrease of spectral efficiency and the decrease of throughput in the target cell 20A after completing the handover. Especially, even when the handover from the source cell 10A to the target cell 20A is not completed for the reason that the terminal 30 moves in the cell boundary area or the like, since the transmission stop of the downlink signal is terminated when the predetermined elapsed time has elapsed, it is possible to prevent the decrease of spectral efficiency and the decrease of throughput.

According to the present embodiment, by terminating the transmission stop of the downlink signal based on the received power difference ΔS(=S2−S1) between the received power S2 of the reference signal from the target base station 20 in the terminal 30 and the received power S1 of the reference signal from the source cell base station 10, the target cell base station 20 can prevent the decrease of spectral efficiency and the decrease of throughput in the target cell 20A after completion of the handover. Especially, even when the handover from the source cell 10A to the target cell 20A is not completed for the reason that the terminal 30 returns from the cell boundary area to the source cell 10A without entering the target cell 20A, since the transmission stop of the downlink signal is terminated when the received power difference ΔS caused by returning to the source cell 10A is lowered, it is possible to prevent the decrease of spectral efficiency and the decrease of throughput.

According to the present embodiment, by terminating the transmission stop of the downlink signal based on the prediction result of the received quality of the downlink signal from the source cell base station 10 in the terminal 30, when the target cell base station 20 terminates the transmission stop of the downlink signal without completing the handover from the source cell 10A to the target cell 20A, the terminal 30 can continue the communication in the source cell 10A with high communication quality with a small interference from the target cell 20A.

In the present embodiment, the source cell base station 10 may instruct the terminal 30 so that the terminal 30 feeds back the received power from the target cell base station 20 and the source cell base station 10 earlier than when the received power difference (S2–S1) to be a reference for starting the handover or the TTT (Time-To-Trigger) as a duration time of the received power difference reaches the normal handover threshold value (A3offset). In this case, the source-cell base station 10 can promptly acquire the information on the received power from the target-cell base station 20 and the source-cell base station 10 in a state in which the interference to the source cell 20A is reduced due to the stop of transmission of the downlink signal from the target-cell base station 20 (or a plurality of neighboring base stations including the target-cell base station).

In the present embodiment, when the received quality Q1 from the source cell base station 10, which is fed back from the terminal 30, falls below the predetermined threshold value, or becomes equal to or lower than the threshold value, the source cell base station 10 may determine to start the handover of the terminal 30 earlier than when the received power difference (S2–S1) to be the reference for starting the handover or the TTT as the duration time of the received power difference reaches the normal handover threshold value (A3offset). In this case, the handover from the source-cell base station 10 to the target-cell base station 20 can be performed at an early stage while preventing a handover failure or a ping-pong handover phenomenon.

In the present embodiment, the source-cell base station 10 requests the terminal 30 to feedback the received power from the target cell base station 20 and the source-cell base station 10 earlier than when the received power difference (S2–S1) to be the reference for starting the handover or the TTT as the duration time of the received power difference reaches the normal handover threshold value (A3offset), when the received quality Q1 from the source cell base station 10, which is fed back from the terminal 30 falls below the predetermined threshold value, or becomes equal to or lower than the threshold value, the source-cell base station 10 may determine to start the handover of the mobile station earlier than when the received power difference (S2–S1) to be the reference for starting the handover or the TTT reaches the normal handover threshold value (A3offset).

It is noted that the process steps and configuration elements in the mobile communication system, the base station and the user terminal apparatus (mobile station) described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, terminal, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 first base station (source-cell base station)
10A cell of the first base station (source cell)
20 second base station (target-cell base station)
20A cell of the second base station (target cell)
30 terminal (mobile station, user equipment, communication terminal apparatus)

The invention claimed is:

1. A mobile communication system comprising:
  a first base station to which a mobile station is connected; and
  one or a plurality of second base stations located in a vicinity of the first base station,
  wherein the first base station compares a received power S2 from the one or the plurality of second base stations, which is fed back from the mobile station, and a received power S1 from the first base station, which is fed back from the mobile station,
  wherein the first base station requests a transmission stop of the downlink signal including at least one of the data signal and the control signal for the one or a plurality of higher-order second base stations in descending order of the received power difference (S2−S1) among the one or the plurality of second base stations in which the received power difference (S2−S1) becomes larger than a first predetermined threshold value, or becomes equal to or larger than the first predetermined threshold value, when a received quality Q1 from the first base station, which is fed back from the mobile station, becomes smaller than a second predetermined threshold value, or becomes equal to or lower than the second predetermined threshold value,
  wherein the one or the plurality of higher-order second base station determine a radio resource in which the transmission of the downlink signal is to be stopped, notify the first base station of the radio resource in response to the request of transmission stop, and stop the transmission of the downlink signal, in response to the request of transmission stop, and
  wherein the first base station allocates the radio resource notified from the one or the plurality of higher-order second base stations or a radio resource partially including the notified radio resource, as a radio resource used for the downlink signal to the mobile station.

2. The mobile communication system according to claim 1,
  wherein the first base station designates at least one of a time and a frequency of a radio resource in which the transmission of the downlink signal is to be stopped, when requesting the second base station to stop the transmission of the downlink signal.

3. The mobile communication system according to claim 1,
  wherein the first base station designates an amount of radio resources in which the transmission of the downlink signal is to be stopped when requesting the second base station to stop the transmission of the downlink signal, and
  wherein the second base station notifies the first base station of at least one of a time and a frequency of a radio resource in which the transmission of the downlink signal is to be stopped, so as to satisfy the radio resource amount designated by the first base station.

4. The mobile communication system according to claim 1,
  wherein the second base station terminates the transmission stop of the downlink signal with respect to a radio resource allocated to a mobile station in which a handover process is completed among the plurality of mobile stations connected to the second base station, when completing the handover process for switching the base station to which the mobile station is connected from the first base station to the second base station.

5. The mobile communication system according to claim 1,
  wherein the second base station terminates the transmission stop of the downlink signal with respect to a radio resource allocated to a mobile station in which a predetermined time from a start of the transmission stop of the downlink signal among the plurality of mobile stations connected to the second base station, when the predetermined time has elapsed from the start of transmission stop of the downlink signal in the second base station.

6. The mobile communication system according to claim 1,
  wherein the second base station terminates the transmission stop of the downlink signal with respect to a radio resource allocated to a mobile station in which the received power difference (S2−S1) is smaller than the first predetermined threshold value, or equal to or smaller than the first predetermined threshold value, among a plurality of mobile stations connected to the second base station, based on the received power difference (S2−S1) between the received power of a reference signal from the second base station in the mobile station and the received power of a reference signal from the first base station.

7. The mobile communication system according to claim 1,
  wherein the second base station terminates the transmission stop of the downlink signal with respect to a radio resource allocated to a mobile station in which a prediction result of the received quality becomes larger than a third predetermined threshold value, or becomes equal to or larger than the third predetermined threshold value, among a plurality of mobile stations connected to the second base station, based on the prediction result of the received quality of the downlink signal from the first base station in the mobile station.

8. The mobile communication system according to claim 1,
  wherein the first base station instructs the mobile station so that the mobile station performs a feedback of the received power from the second base station and the first base station earlier than when the received power difference (S2−S1), which is a reference for starting a handover for switching a base station to which the mobile station is connected from the first base station to the second base station, reaches a normal handover threshold value.

9. The mobile communication system according to claim 1,
  wherein, when the received quality Q1 from the first base station, which is fed back from the mobile station, falls below a third predetermined threshold value, or becomes equal to or lower than the third predetermined threshold value, the first base station determines to start the handover of the mobile station earlier than when the received power difference (S2−S1), which is a reference for starting the handover for switching a base station to which the mobile station is connected from the first base station to the second base station, reaches a normal handover threshold value.

10. A mobile communication system comprising:
a first base station to which a mobile station is connected; and
one or a plurality of second base stations located in a vicinity of the first base station,
wherein the first base station compares a received power S2 from the second base station, which is fed back from the mobile station, and a received power S1 from the first base station, which is fed back from the mobile station;
wherein the first base station requests the second base station to stop a transmission of a downlink signal including at least one of a data signal and a control signal when a received power difference (S2−S1) between the received powers becomes a first predetermined threshold value, or becomes equal to or larger than the first predetermined threshold value and when a received quality Q1 from the first base station, which is fed back from the mobile station, becomes smaller than a second predetermined threshold value or becomes lower than the second predetermined threshold value;
wherein the second base station performs a determination of a radio resource in which the transmission of the downlink signal is to be stopped and a notification of the radio resource to the first base station, and stops a transmission of downlink signal, in response to the request of transmission stop;
wherein the first base station allocates the radio resource notified from the second base station or a radio resource partially including the notified radio resources, as a radio resource used for the downlink signal to the mobile station;
wherein the first base station requests the second base station so that the mobile station performs a feedback of the received power from the second base station and the first base station earlier than when the received power difference (S2−S1), which is a reference for starting a handover to switch a base station to which the mobile station is connected from the first base station to the second base station, reaches a normal handover threshold value; and
wherein the first base station determines to start the handover of the mobile station earlier than when the received power difference (S2−S1), which is a reference for starting the handover of the mobile station, reaches the normal handover threshold value, and when the received quality Q1 from the first base station, which is fed back from the mobile station, falls below a third predetermined threshold value, or becomes equal to or lower than the third predetermined threshold value.

* * * * *